US012522461B2

(12) United States Patent
Okada et al.

(10) Patent No.: US 12,522,461 B2
(45) Date of Patent: Jan. 13, 2026

(54) SHEET SUPPLY DEVICE AND IMAGE FORMING APPARATUS

(71) Applicants: Katsumi Okada, Kanagawa (JP); Daiki Satoh, Kanagawa (JP)

(72) Inventors: Katsumi Okada, Kanagawa (JP); Daiki Satoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 217 days.

(21) Appl. No.: 18/114,277

(22) Filed: Feb. 27, 2023

(65) Prior Publication Data

US 2023/0271800 A1 Aug. 31, 2023

(30) Foreign Application Priority Data

Feb. 28, 2022 (JP) ................................ 2022-030049

(51) Int. Cl.
*B41J 11/00* (2006.01)
*B41J 15/04* (2006.01)
(Continued)

(52) U.S. Cl.
CPC .......... *B65H 23/198* (2013.01); *B41J 11/006* (2013.01); *B41J 11/0095* (2013.01);
(Continued)

(58) Field of Classification Search
CPC .... B65H 23/198; B65H 16/10; B65H 18/103; B65H 20/36; B65H 23/185; B65H 26/00;
(Continued)

(56) References Cited

U.S. PATENT DOCUMENTS

2016/0136980 A1* 5/2016 Kobayashi ............. B65H 23/16 226/91
2018/0257893 A1* 9/2018 Suzuki ................... B65H 20/02
(Continued)

FOREIGN PATENT DOCUMENTS

JP 4-358659 12/1992
JP 6-001506 1/1994
(Continued)

OTHER PUBLICATIONS

Office Action issued on Oct. 21, 2025, in corresponding Japanese patent Application No. 2022-030049, 5 pages.

*Primary Examiner* — Yaovi M Ameh
(74) *Attorney, Agent, or Firm* — XSENSUS LLP

(57) ABSTRACT

A sheet supply device includes a supporter, a rotation device, a guide, a support shaft, a biasing member, a sensor, a roller, and control circuitry. The sensor is disposed to protrude from the facing portion toward the roll and biased in a direction to contact the outer peripheral surface of the roll. The sensor outputs a detection signal at a level corresponding to an amount at which the sensor protrudes from the facing portion. The roller is supported by the facing portion, to contact the outer peripheral surface of the roll at a position different from a position of the sensor in a circumferential direction of the roll. The control circuitry controls the rotation device based on a signal change rate that is a change amount of the level of the detection signal per unit time. The control circuitry causes the rotation device to rotate the spool in the winding direction, and stops an operation of the rotation device when the signal change rate based on a change in relative positions between the outer peripheral surface and the sensor without passage of a leading end of the sheet through the position of the sensor does not exceed a predetermined reverse set threshold value.

12 Claims, 22 Drawing Sheets

(51) Int. Cl.

| | |
|---|---|
| ***B65H 16/10*** | (2006.01) |
| ***B65H 18/10*** | (2006.01) |
| ***B65H 20/36*** | (2006.01) |
| ***B65H 23/185*** | (2006.01) |
| ***B65H 23/198*** | (2006.01) |
| ***B65H 26/00*** | (2006.01) |
| ***B65H 26/06*** | (2006.01) |

(52) U.S. Cl.

CPC .............. *B41J 15/04* (2013.01); *B65H 16/10* (2013.01); *B65H 18/103* (2013.01); *B65H 20/36* (2013.01); *B65H 23/185* (2013.01); *B65H 26/00* (2013.01); *B65H 26/06* (2013.01); *B65H 2301/41342* (2013.01); *B65H 2301/41387* (2013.01); *B65H 2301/522* (2013.01); *B65H 2403/942* (2013.01); *B65H 2513/11* (2013.01); *B65H 2701/1311* (2013.01); *B65H 2801/03* (2013.01); *B65H 2801/36* (2013.01)

(58) Field of Classification Search

CPC .......... B65H 26/06; B65H 2301/41342; B65H 2301/41387; B65H 2301/522; B65H 2403/942; B65H 2513/11; B65H 2701/1311; B65H 2801/03; B65H 2801/36; B41J 11/006; B41J 11/0095; B41J 15/04

See application file for complete search history.

(56) References Cited

U.S. PATENT DOCUMENTS

| | | | | |
|---|---|---|---|---|
| 2021/0370693 | A1 * | 12/2021 | Okada .................. | B65H 16/005 |
| 2021/0371227 | A1 * | 12/2021 | Okada ...................... | B65H 7/08 |
| 2022/0363504 | A1 | 11/2022 | Okada | |

FOREIGN PATENT DOCUMENTS

| | | | | | |
|---|---|---|---|---|---|
| JP | 8-333039 | | | 12/1996 | |
| JP | H09-52645 | A | | 2/1997 | |
| JP | 2004-291596 | A | | 10/2004 | |
| JP | 2018-150107 | | | 9/2018 | |
| JP | 2019-073346 | A | | 5/2019 | |
| JP | 2021-113118 | | | 8/2021 | |
| JP | 2021113118 | A | * | 8/2021 | ........... B65H 19/105 |
| JP | 2021-187681 | A | | 12/2021 | |

* cited by examiner

SHEET SUPPLY DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-030049, filed on Feb. 28, 2022, in the Japan Patent Office, the entire disclosure of which is hereby incorporated by reference herein.

BACKGROUND

Technical Field

Embodiments of the present disclosure relate to a sheet supply device and an image forming apparatus.

Related Art

There is known an image forming apparatus that includes a sheet supply device that supplies a long sheet (hereinafter, referred to as "continuous sheet") wound around a winding cylinder (spool) and forms a continuous sheet image to be supplied. In the sheet supply device, a sheet supply mechanism is already known in which a user inserts a front end of a continuous sheet (hereinafter referred to as "front end of sheet") into a supply device by hand, and then the device performs a sheet supply operation after detecting the front end.

In relation to a conventional sheet supply mechanism, there is known a technique by which the spool is rotated in a direction in which the continuous sheet is wound, a sensor detects the peeled sheet front end, and after the detection of the front end, the spool is rotated forward in a direction in which the continuous sheet is fed.

SUMMARY

According to an embodiment of the present disclosure, a sheet supply device includes a supporter, a rotation device, a guide, a support shaft, a biasing member, a sensor, a roller, and control circuitry. The supporter supports a roll that is a long sheet wound around a spool. The rotation device rotates the spool supported by the supporter in a feeding direction in which the sheet is fed out from the spool and a winding direction in which the sheet is wound around the spool. The guide has a facing portion facing an outer peripheral surface of the roll and a guide portion extending from the facing portion in the feeding direction of the sheet. The support shaft supports the guide such that the guide is rotatable in a direction in which the facing portion approaches or moves away from the outer peripheral surface, with a downstream end of the guide in the feeding direction as a rotation center. The biasing member biases the guide such that the guide rotates in a direction in which the facing portion approaches the roll. The sensor is disposed to protrude from the facing portion toward the roll and biased in a direction to contact the outer peripheral surface of the roll. The sensor outputs a detection signal at a level corresponding to an amount at which the sensor protrudes from the facing portion. The roller is supported by the facing portion, to contact the outer peripheral surface of the roll at a position different from a position of the sensor in a circumferential direction of the roll. The control circuitry controls the rotation device based on a signal change rate that is a change amount of the level of the detection signal per unit time. The control circuitry causes the rotation device to rotate the spool in the winding direction, and stops an operation of the rotation device when the signal change rate based on a change in relative positions between the outer peripheral surface and the sensor without passage of a leading end of the sheet through the position of the sensor does not exceed a predetermined reverse set threshold value.

According to another embodiment of the present disclosure, an image forming apparatus includes the sheet supply device and an image forming device to form an image on a sheet supplied by the sheet supply device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
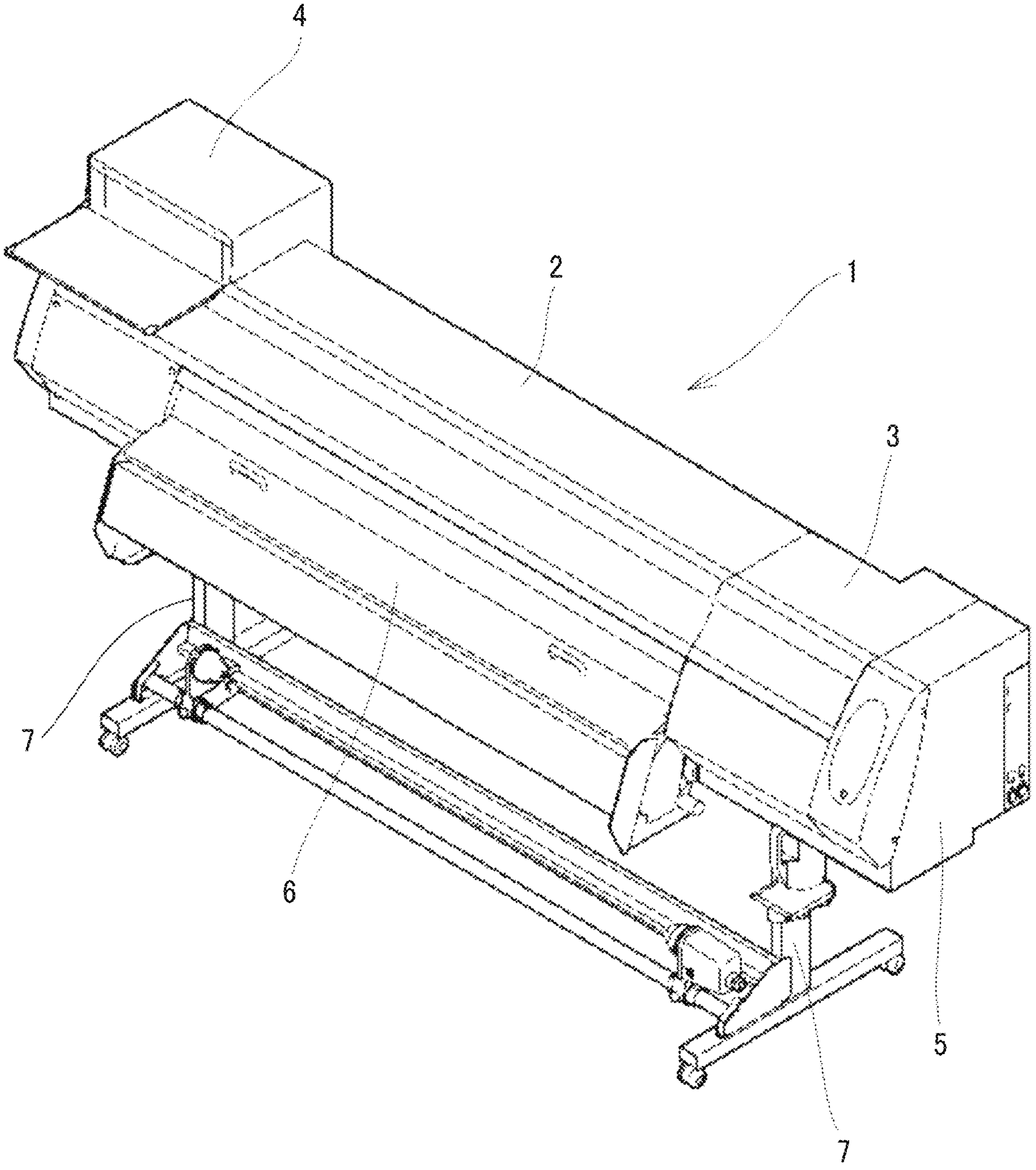
FIG. 1 is an external perspective view of an image forming apparatus according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Figure 2:
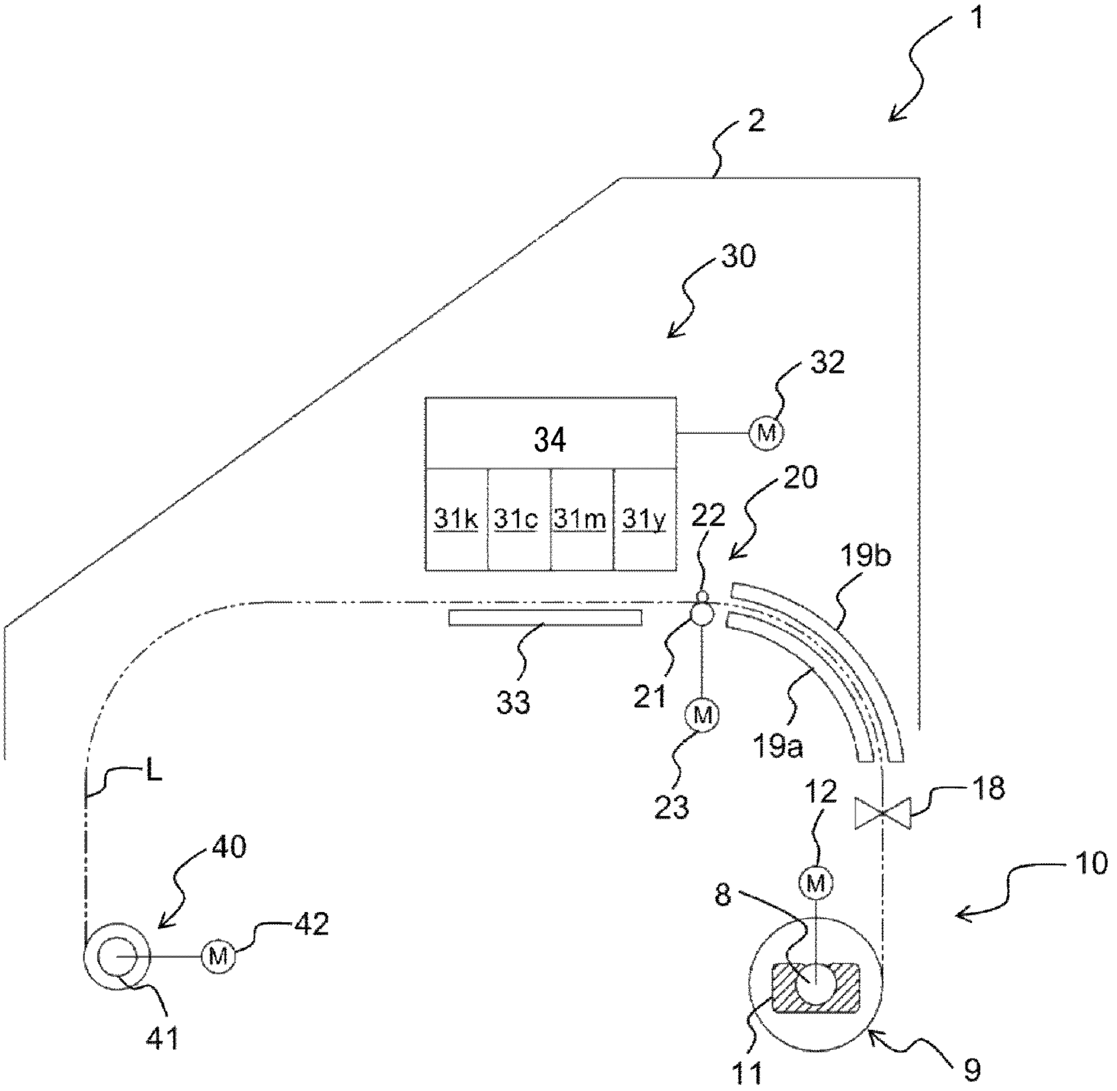
FIG. 2 is a cross-sectional view of the internal structure of the image forming apparatus.

Hereinafter, a printer 1 as an image forming apparatus according to an embodiment of the present disclosure will be described with reference to FIGS. 1 and 2. FIG. 1 is an external perspective view of the printer 1 according to the present embodiment. FIG. 2 is a cross-sectional view of the internal structure of the printer 1.

As illustrated in FIG. 1, the printer 1 as an embodiment of an image forming apparatus includes a central cover 2, a right cover 3 and a left cover 4 located at both ends of the long central cover 2, side plates 5 located at outer ends of the right cover 3 and the left cover 4, and an operation cover 6 that opens and closes with respect to the central cover 2, in the printer 1, these covers (the right cover 3, left cover 4, side plates 5, and operation cover 6) form the outer shape of a housing. The printer 1 is supported by legs 7 provided near both ends along the longitudinal direction of the apparatus body covered by the covers. The legs 7 are provided with casters for facilitating movement.

The printer 1 according to the present embodiment is an inkjet image forming apparatus that ejects liquid ink onto a continuous sheet P as a long sheet to form an image on the continuous sheet P. However, the image forming method of the printer 1 is not limited to the inkjet method, and may be an electrophotographic method or the like.

As illustrated in FIG. 2, the printer 1 mainly includes a sheet supply device 10 as the sheet supply device according to an embodiment of the present disclosure, a conveyance device 20, an image forming device 30, a winding device 40, and a controller 50 as a control device. A detailed configuration of the controller 50 will be described later with reference to FIG. 8.

The sheet supply device 10 feeds and supplies the continuous sheet P wound around a spool 8 (winding cylinder) to the conveyance device 20 through a conveyance path L. The conveyance path L is a space through which the continuous sheet P passes in the printer 1. More specifically, the conveyance path L is a path from the sheet supply device 10 to the winding device 40 via the conveyance device 20 and the image forming device 30. Details of the sheet supply device 10 will be described later with reference to FIGS. 3 to 7B.

The conveyance device 20 conveys the continuous sheet P supplied from the sheet supply device 10 through the conveyance path L to the winding device 40 through a position facing the image forming device 30. The conveyance device 20 mainly includes a conveyance roller 21, a pressure roller 22, and a conveyance motor 23. The conveyance roller 21 and the pressure roller 22 rotate while holding the continuous sheet P from both sides in a thickness direction of the continuous sheet P. The conveyance roller 21 is rotated by transmission of driving force of the conveyance motor 23. The pressure roller 22 is pressed by the conveyance roller 21 under a predetermined pressure and is rotated with rotation of the conveyance roller 21.

The image forming device 30 is arranged downstream of the sheet conveyance device 20 in the sheet conveyance direction of the continuous sheet P. The image forming device 30 ejects ink onto the continuous sheet P conveyed by the conveyance device 20 to form an image on the continuous sheet P. The image forming device 30 mainly includes recording heads 31, a carriage motor 32, a platen 33, and a main-scanning carriage 34.

When the driving force of the carriage motor 32 is transmitted, the main-scanning carriage 34 reciprocates in the main-scanning direction orthogonal to the conveyance direction of the continuous sheet P. The main-scanning carriage 34 is provided with recording heads 31 that discharge liquid ink of black (k), cyan (c), magenta (m), and yellow (y). More particularly, the main-scanning carriage 34 is provided with a recording head 31*k* that ejects black ink, a recording head 31*c* that ejects cyan ink, a recording head 31*m* that ejects magenta ink, and a recording head 31*y* that ejects yellow ink.

Each of the recording heads 31 ejects liquid ink of the corresponding color toward the continuous sheet P supported by the platen 33 according to an instruction from the controller 50. In general, the recording heads 31 discharge liquid ink in the direction of gravity. Therefore, the positional relationship between the main-scanning carriage 34 and the platen 33 is a vertical relationship in the direction of gravity. That is, the platen 33 is arranged below the main-scanning carriage 34 facing the platen. The platen 33 supports the continuous sheet P conveyed by the conveyance device 20.

The winding device 40 is arranged downstream of the conveyance device 20 and the image forming device 30 in the conveyance direction of the continuous sheet P. The winding device 40 winds the continuous sheet P on which an image has been formed by the image forming device 30. The winding device 40 mainly includes a winding roller 41 and a winding motor 42. When the driving force of the winding motor 42 is transmitted, the winding roller 41 rotates in the direction of winding the continuous sheet P with the image formed.

Figure 22A:
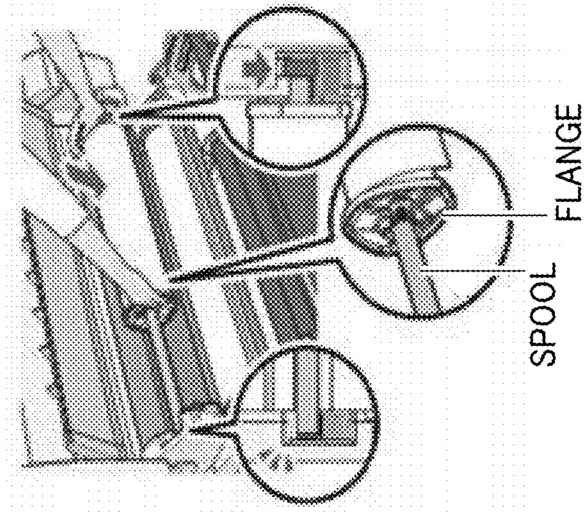
FIGS. 22A to 22E are diagrams illustrating a comparative example of a method for setting roll paper.
Figure 22B:
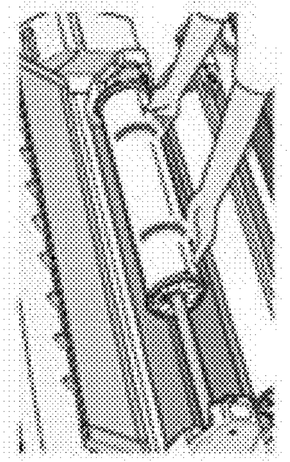
Figure 22C:
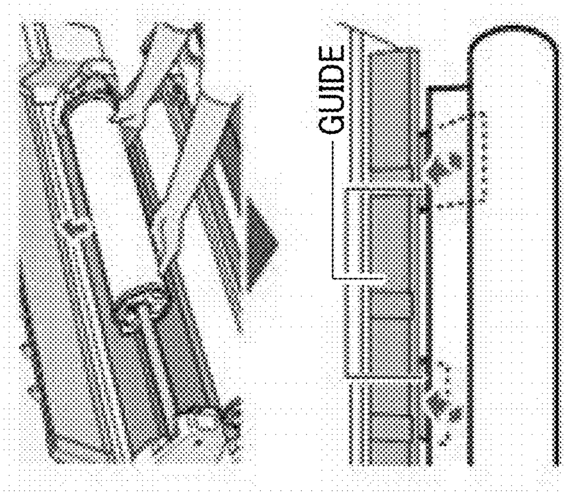

A comparative example of a roll paper setting method will be described with reference to FIGS. 22A to 22E. The roll paper is provided with a flange (flange member) at an end as seen in the width direction, and the spool is set to the roll paper. The user sets the roll paper with the spool to a paper feeder receiver (spool bearing stand) of the apparatus (FIG. 22A), finds the front end of the roll paper, holds the roll paper with both hands as illustrated in FIG. 22B while maintaining the front end, and rotates the roll paper so that the front end of the paper comes to the front. Next, the user inserts the roll paper while rotating the roll paper with the front end positioned between the guide plates at the back of the roll paper (FIG. 22C). When the user inserts the sheet into the back of the guides, the sheet is secured inside and is drawn into the apparatus.

As illustrated in FIG. 22C, since the guide plates between which the front end of the sheet is inserted are at the back of the roll paper, the guide plates are hidden behind the roll paper and is difficult to see. Therefore, it is difficult to confirm whether the roll sheet has been completely inserted.

Figure 22D:
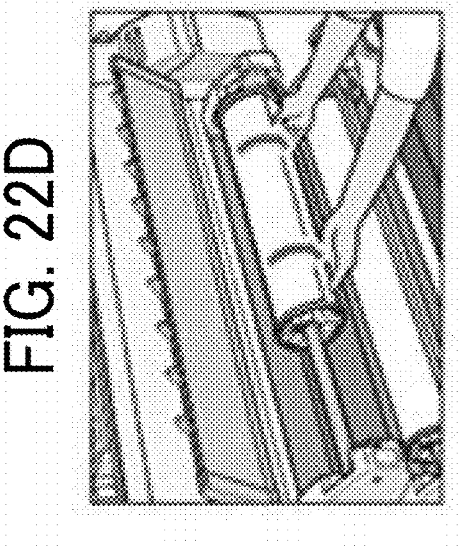
Figure 22E:
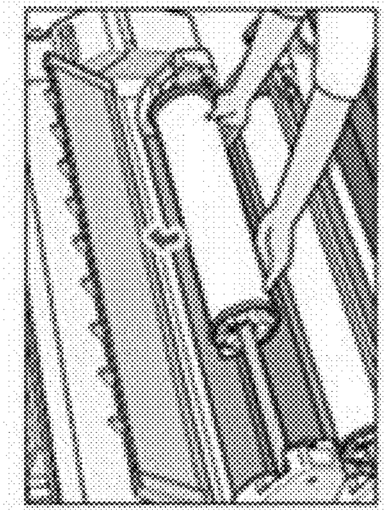

In the apparatus in which the roll paper setting device includes two stages as illustrated in FIGS. 22D and 22E, while roll paper is already set in the upper stage, in the case of setting other roll paper in the lower stage and inserting the front end of the other roll paper between the guide plates, it is further difficult to see the guide plates due to the roll paper in the upper stage, and the other roll paper may be difficult to set in the lower stage or may be obliquely set in the lower stage.

In the comparative example of the roll paper setting method described above, when the front end of the roll paper is found and inserted in the conveyance direction, it is difficult to confirm whether the roll paper has been properly inserted, and it is necessary to uniformly insert the front end of the paper, which is a time-consuming work. In a case where the front end of the sheet is not evenly inserted, the sheet is obliquely fed and causes skew, and it takes more time and effort for re-operation or removal of a paper jam.

The sheet supply device according to an embodiment of the present disclosure solves the above-described problems. An embodiment of the present disclosure also solves problems that could occur in a case where the roll paper is set in the reverse direction in the paper feeding receiver (spool bearing stand) of the apparatus. Hereinafter, the sheet supply device 10 as the sheet supply device according to an embodiment of the present disclosure will be described in detail with reference to the drawings.

Figure 3:
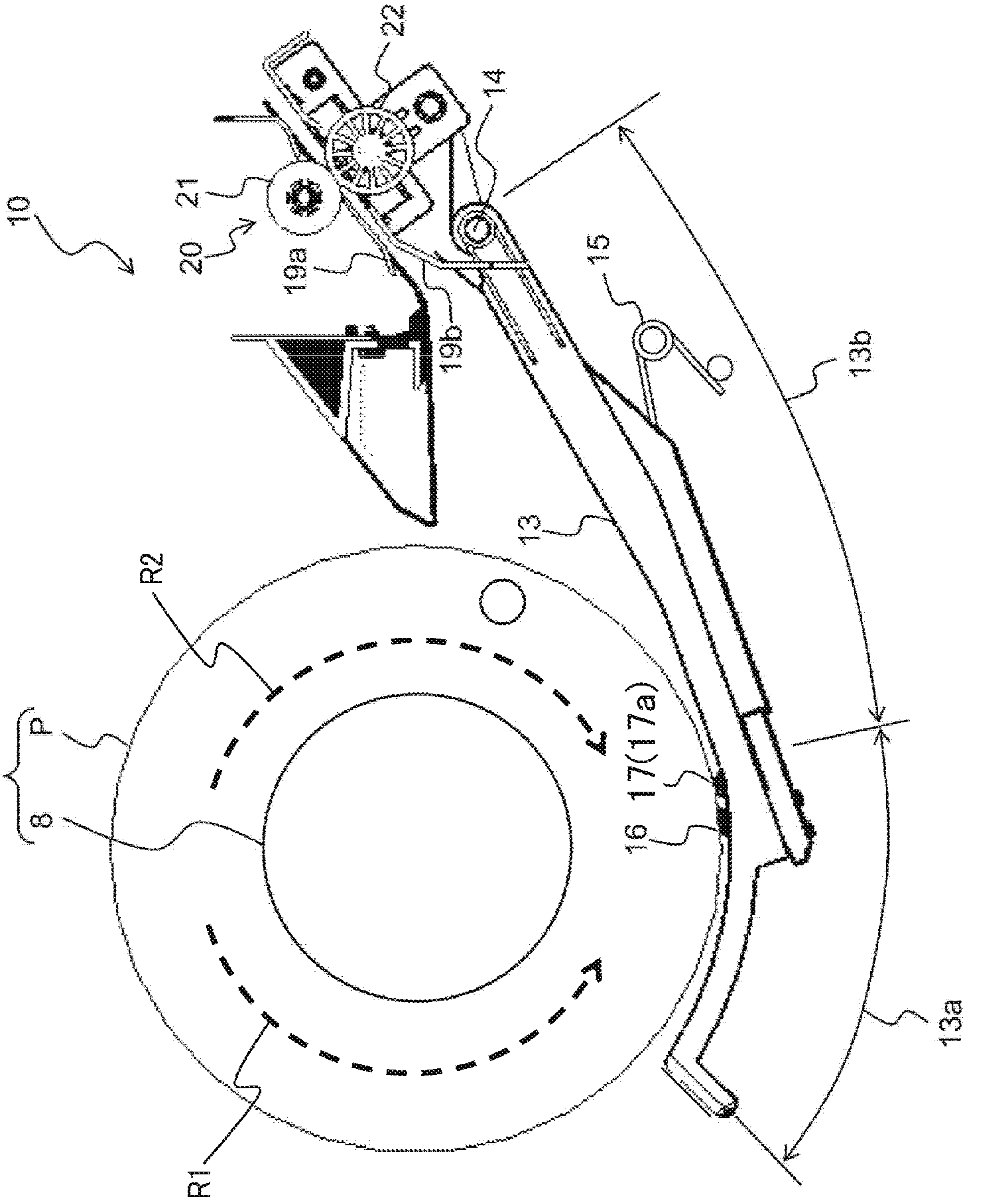
FIG. 3 is a schematic configuration diagram of a sheet supply device.
Figure 4:
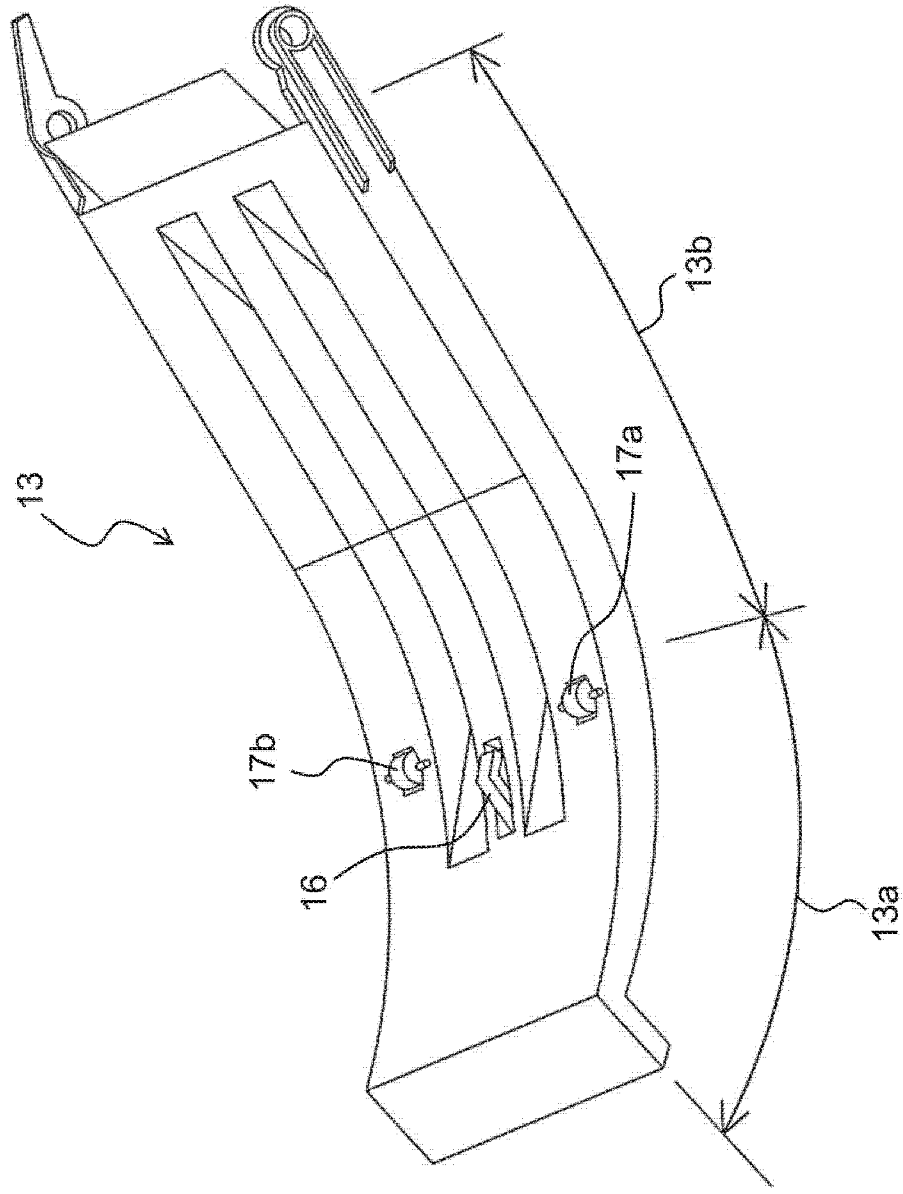
FIG. 4 is a perspective view of a guide arm.

FIG. 3 is a schematic configuration diagram of the sheet supply device 10. FIG. 4 is a perspective view of the guide arm 13 included in the sheet supply device 10. As illustrated in FIGS. 2 to 4, the sheet supply device 10 mainly includes a supporter 11, a supply motor 12, a guide arm 13, a support shaft 14, a coil spring 15, a front end detection sensor 16, a plurality, of rollers 17 (right roller 17*a* and left roller 17*b*), a cutter 18, and a guide plate 19 (upper guide plate 19*a*, and lower guide plate 19*b*).

The supporter 11 supports a roll 9 formed by winding the continuous sheet P around the shaft-shaped spool 8. The supporter 11 detachably supports the roll 9. The supporter 11 rotatably supports both ends of the spool 8.

The supply motor 12 as a rotation device rotates the spool 8 supported by the supporter 11 in a predetermined rotation direction. The rotation of the spool 8 by the supply motor 12 is divided into "forward rotation" in which the continuous sheet P is rotated in the direction of a feeding direction R1 in which to feed the continuous sheet P and "backward rotation" in which the continuous sheet P is rotated in the direction of a winding direction R2 in which to wind the continuous sheet P.

The guide arm 13 as a guide member plays the role of bring the front end detection sensor 16 and the rollers 17 (the right roller 17*a* and left roller 17*b*) into contact with the roll 9 and guiding the continuous sheet P fed out from the roll 9 to between the guide plates 19. The guide arm 13 has an elongated plate-like outer shape. The guide arm 13 includes a facing portion 13*a* and a guide portion 13*b*.

The facing portion 13*a* has an arc-shaped outer shape along the outer peripheral surface of the roll 9. The facing portion 13*a* faces the outer peripheral surface of the roll 9 below a horizontal line passing through the rotation center of the spool 8. The guide portion 13*b* extends from the facing portion 13*a* toward the downstream side in the supply direction of the continuous sheet P. More particularly, the facing portion 13*a* is provided so as to face a region (lower region) including the lower end of the roll 9, and the guide portion 13*b* extends from the facing portion 13*a* to a position between the guide plates 19.

The support shaft 14 extends in the same direction as the extending direction of the spool 8 supported by the supporter 11. The support shaft 14 is secured to the inside of each cover. The support shaft 14 is attached to a downstream end of the guide portion 13*b* in the supply direction of the continuous sheet P, and rotatably supports the guide arm 13. That is, the guide arm 13 is rotatable in a direction in Which the facing portion 13*a* is brought into contact with or moves away from the roll 9 with the support shaft 14 as a rotation center.

The coil spring 15 as a biasing member biases the guide arm 13 in a direction in which the facing portion 13*a* approaches the roll 9.

The front end detection sensor 16 protrudes from the facing portion 13*a* in a direction in which to contact the roll 9. The front end detection sensor 16 is supported such that the amount of protrusion from the facing portion 13*a* varies with a change in the relative positional relationship between the facing portion 13*a* and the facing surface of the roll 9. The front end detection sensor 16 is biased in a direction in which to contact the outer peripheral surface of the roll 9 (that is, in a direction to protrude from the facing portion 13*a*). Then, the front end detection sensor 16 outputs a detection signal of a level corresponding to the protruding amount from the facing portion 13*a*, to the controller 50. More particularly, the level of the detection signal increases as the protrusion amount of the front end detection sensor 16 toward the roll 9 with respect to the facing portion 13*a* is larger. Conversely, the level of the detection signal decreases as the protrusion amount of the front end detection sensor 16 with respect to the facing portion 13*a* is smaller (as the amount of sinking in the facing portion 13*a* is smaller).

The plurality of rollers 17 is rotatably supported by the facing portion 13*a*. The rotation shaft of each roller 17 extends in the same direction as the extending direction of the spool 8 and support shaft 14. Each roller 17 is arranged at a position different from the position of the front end detection sensor 16 in the circumferential direction of the roll 9. For example, in the example of FIG. 3, the rollers 17 is arranged upstream of the front end detection sensor 16 in the winding direction R2. The rollers 17 are arranged apart from each other in the width direction orthogonal to the circumferential direction of the roll 9, and the front end detection sensor 16 is arranged between the right roller 17*a* and the left roller 17*b*.

The cutter 18 cuts the front end of the continuous sheet P over the entire width direction. The line of cutting by the cutter 18 extends in a direction orthogonal to the supply direction of the continuous sheet P. That is, in a case where the front end of the continuous sheet P is inclined (skewed) with respect to the supply direction, the front end of the continuous sheet P can be made orthogonal to the supply direction by cutting the front end of the continuous sheet P with the cutter 18.

The guide plates 19 (the upper guide plate 19*a* and lower guide plate 19*b*) are arranged downstream of the guide arm 13 in the supply direction of the continuous sheet P. The upper guide plate 19*a* and the lower guide plate 19*b* are arranged to face each other across the conveyance path L. The continuous sheet P traveling along the guide arm 13 passes between the upper guide plate 19*a* and the lower guide plate 19*b* and is supplied to the conveyance device 20.

That is, the guide plates 19 serve as a sheet feeder into which the continuous sheet P fed out from the roll 9 enters.

Description of Case Where Roll is Set in Proper Direction

Figure 5:
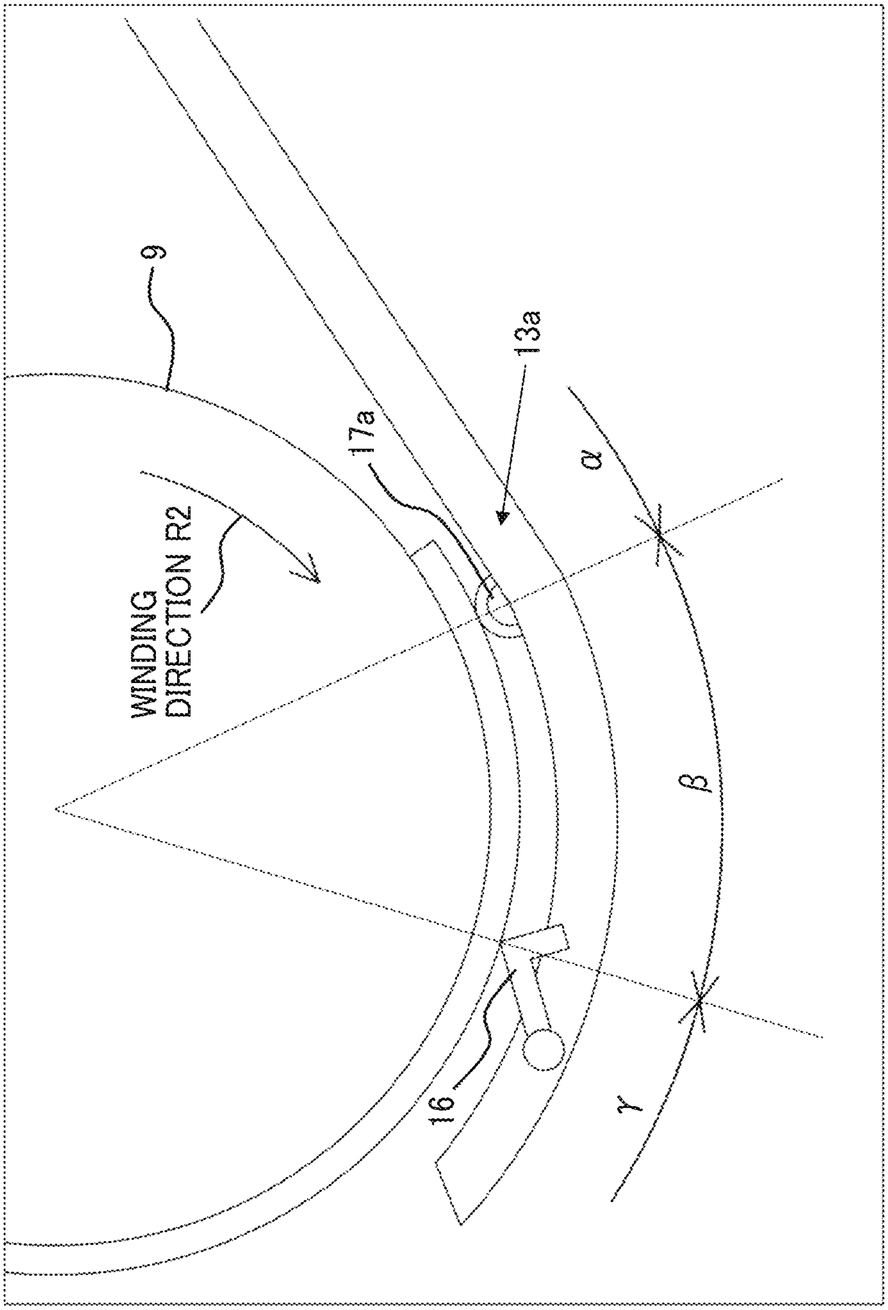
FIG. 5 is an enlarged view of a periphery of a facing portion.
Figure 6A:
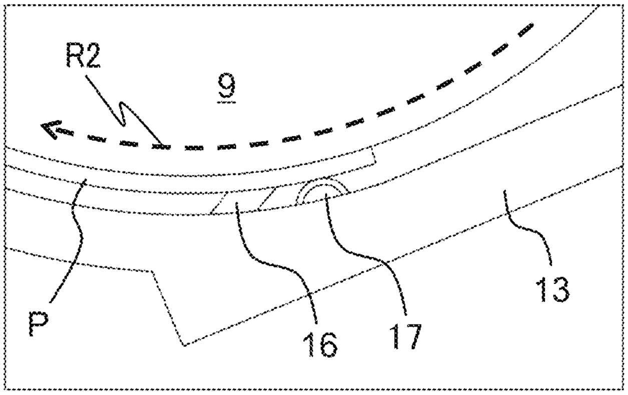
FIGS. 6A to 6C are diagrams illustrating a positional relationship between the front end of a continuous sheet and a front end detection sensor and a roller.
Figure 6B:
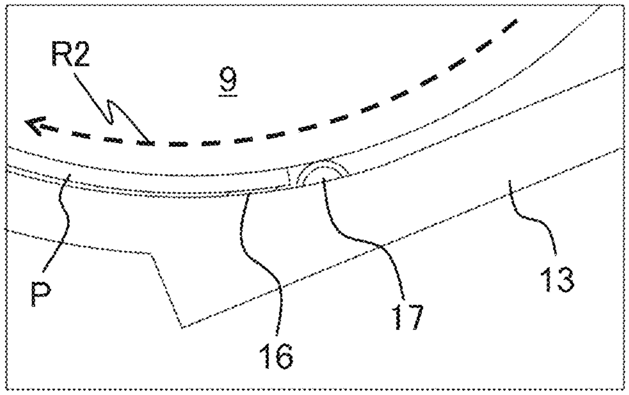
Figure 6C:
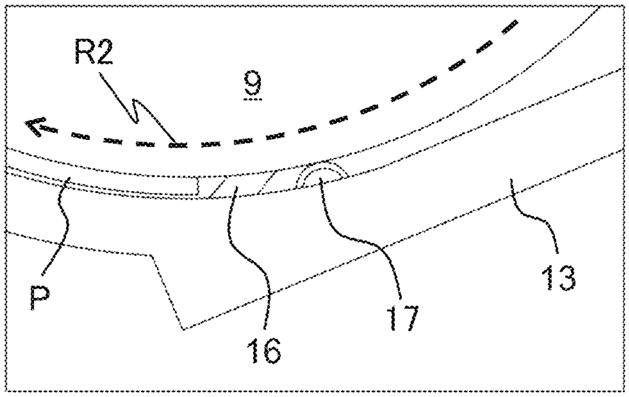
Figure 7A:
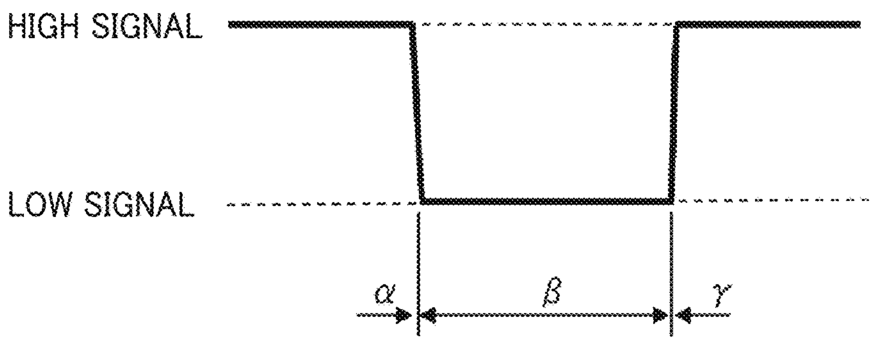
FIGS. 7A and 7B are diagrams illustrating transition of a level of a detection signal of the front end detection sensor.
Figure 7B:
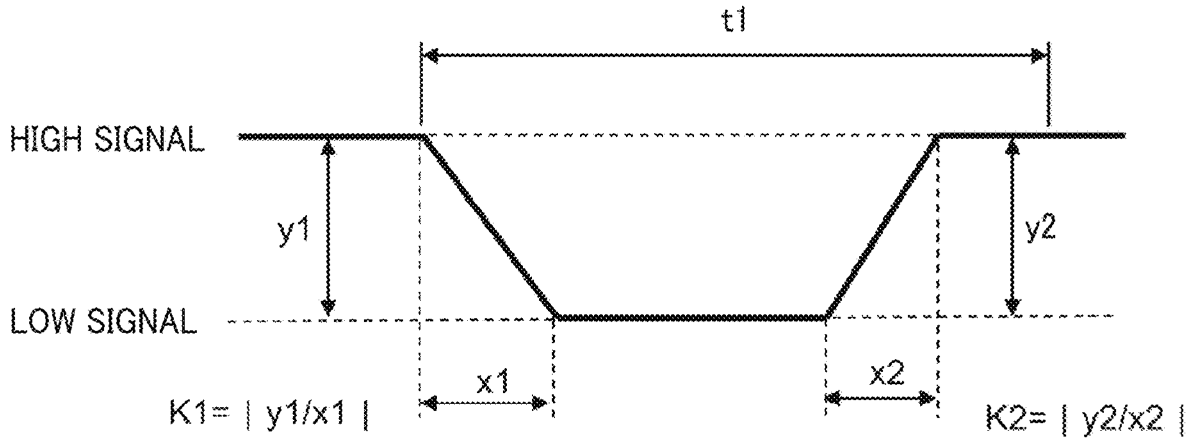

First, description will be provided as to the operation of detecting the front end of the continuous sheet P (hereinafter referred to as "front end of the sheet") in a case where the roll 9 is set in a proper direction and then the spool 8 is rotated in the winding direction R2. FIGS. 5 to 7B are a series of diagrams illustrating a relationship between the position of the front end of the sheet and the level of the detection signal output from the front end detection sensor 16. FIG. 5 is an enlarged view of the periphery of the facing portion 13*a*. FIGS. 6A to 6C are diagrams illustrating a positional relationship between the front end of the sheet and the front end detection sensor 16 and the rollers 17. FIGS. 7A and 7B are diagrams illustrating temporal transition of the level of the detection signal from the front end detection sensor 16.

Since the guide arm 13 is biased in the direction approaching the roll 9 by the coil spring 15 as a biasing member, the front end detection sensor 16 and the rollers 17 are in contact with the outer peripheral surface of the roll 9 as illustrated in FIG. 5. When the spool 8 is rotated in the winding direction R2, the front end of the sheet in close contact with the outer peripheral surface of the roll 9 passes through the rollers 17, and further passes through the front end detection sensor 16 by the rotation in the winding direction R2. In the following description, as illustrated in FIG. 5, a region where the front end of the sheet travels before passing through the rollers 17 will be referred to as "region α". A region where the front end of the sheet has already passed through the rollers 17 and travels before passing through the front end detection sensor 16 will be referred to as "region β". A region where the front end of the sheet has already passed through the front end detection sensor 16 will be referred to as "region γ".

FIG. 6A illustrates a state in which the front end of the sheet is located in the region α. FIG. 6B illustrates a state in which the front end of the sheet is located in the region β. First, as illustrated in FIGS. 6A and 6B, when the front end of the sheet passes through the roller 17, the guide arm 13 rotates by the thickness of the continuous sheet P in a direction in which the rollers 17 contact the outer peripheral surface of the roll 9. As a result, the front end detection sensor 16 is sinks into the facing portion 13*a* by the thickness of the continuous sheet P. That is, when the front end of the sheet passes through the roller 17, the protrusion amount of the front end detection sensor 16 decreases.

FIG. 6C illustrates a state in which the front end of the sheet has reached the region γ. As illustrated in FIGS. 6B and 6C, when the front end of the sheet passes through the front end detection sensor 16, the rollers 17 contact the outer peripheral surface of the continuous sheet P, so that a gap corresponding to the thickness of the continuous sheet P is generated. As a result, the front end detection sensor 16 protrudes from the facing portion 13*a* by the amount corresponding to the thickness of the continuous sheet P. That is, when the front end of the sheet passes through the front end detection sensor 16, the protrusion amount of the front end detection sensor 16 increases.

FIG. 7A illustrates changes in the detection signal from the front end detection sensor 16 when the roll 9 rotates in the winding direction R2 such that the front end of the sheet extends from FIG. 6A to FIGS. 6B and 6C. That is, as illustrated in FIG. 7A, the detection signal from the front end detection sensor 16 is a high signal before the front end of the sheet passes through the rollers 17 (region α), and is a low signal after the front end of the sheet passes through the rollers 17 (region β). The high signal is higher in level than the low signal. That is, the level of the detection signal from the front end detection sensor 16 decreases when the front end of the sheet passes through the rollers 17 (the right roller 17*a* and left roller 17*b*).

After the front end of the sheet passes through the front end detection sensor 16 (region γ), the detection signal from the front end detection sensor 16 changes from the low signal to the high signal. That is, the level of the detection signal from the front end detection sensor 16 increases as the front end of the sheet passes through the front end detection sensor 16.

As illustrated in FIG. 7B, microscopic observation of the changes in the level of the detection signal has revealed that, in the process in which the front end of the sheet passes through the rollers 17, the detection signal from the front end detection sensor 16 decreases by a signal level y1 during a time x1. In addition, in the process in which the front end of the sheet passes through the front end detection sensor 16, the detection signal from the front end detection sensor 16 increases by a signal level y2 during a time x2.

Hereinafter, the amount of change in the level of the detection signal per unit time will be referred to as "signal change rate". The signal change rate at the time of sinking of the front end detection sensor 16 will be referred to as first change rate, and the signal change rate at the time of protrusion of the front end detection sensor 16 will be referred to as second change rate. Although described later in detail, the amount of change per unit time in the level of the detection signal generated at the rotation of the roll 9 in the winding direction R2 with the roll 9 erroneously set will be referred to as reverse set change rate.

The first signal change rate $K1|=y1/x1|$ at the time of passage of the front end of the sheet through the rollers 17 exceeds a predetermined first threshold value at the time of rotation in the winding direction R2 if the roll 9 is properly set. The second signal change rate $K2=|y2/x2|$ at the time of passage of the front end of the sheet through the front end detection sensor 16 exceeds a predetermined second threshold value at the time of rotation in the winding direction R2 if the roll 9 is properly set. The first threshold value and the second threshold value may be the same value or different values.

Description of Case Where Roll is Set in Reverse Direction

As described above, when the roll 9 is set in a proper direction, the continuous sheet P is wound around the spool 8 in the reverse direction of the winding direction R2. In this case, since the front end of the sheet is oriented in the reverse direction of the winding direction R2, the detection signal changes as illustrated in FIGS. 7A and 7B.

On the other hand, when the roll 9 is set in the reverse direction of the proper direction, the front end of the sheet is oriented in the winding direction R2 of the roll 9. This state will be referred to as "reversely set state". When the reversely set roll 9 is rotated in the winding direction R2, the change in the detection signal from the front end detection sensor 16 does not occur like the case of FIGS. 7A and 7B described above. Therefore, the front end detection process based on the signal change order in FIGS. 7A and 7B cannot be performed in the reversely set state.

The reversely set state can be detected using the change in the detection signal from the front end detection sensor 16 with the roll 9 rotated in the winding direction R2. Therefore, in the front end detection process of the roll 9, the reversely set state is also detected so that the front end detection process can be normally executed.

Figure 8:
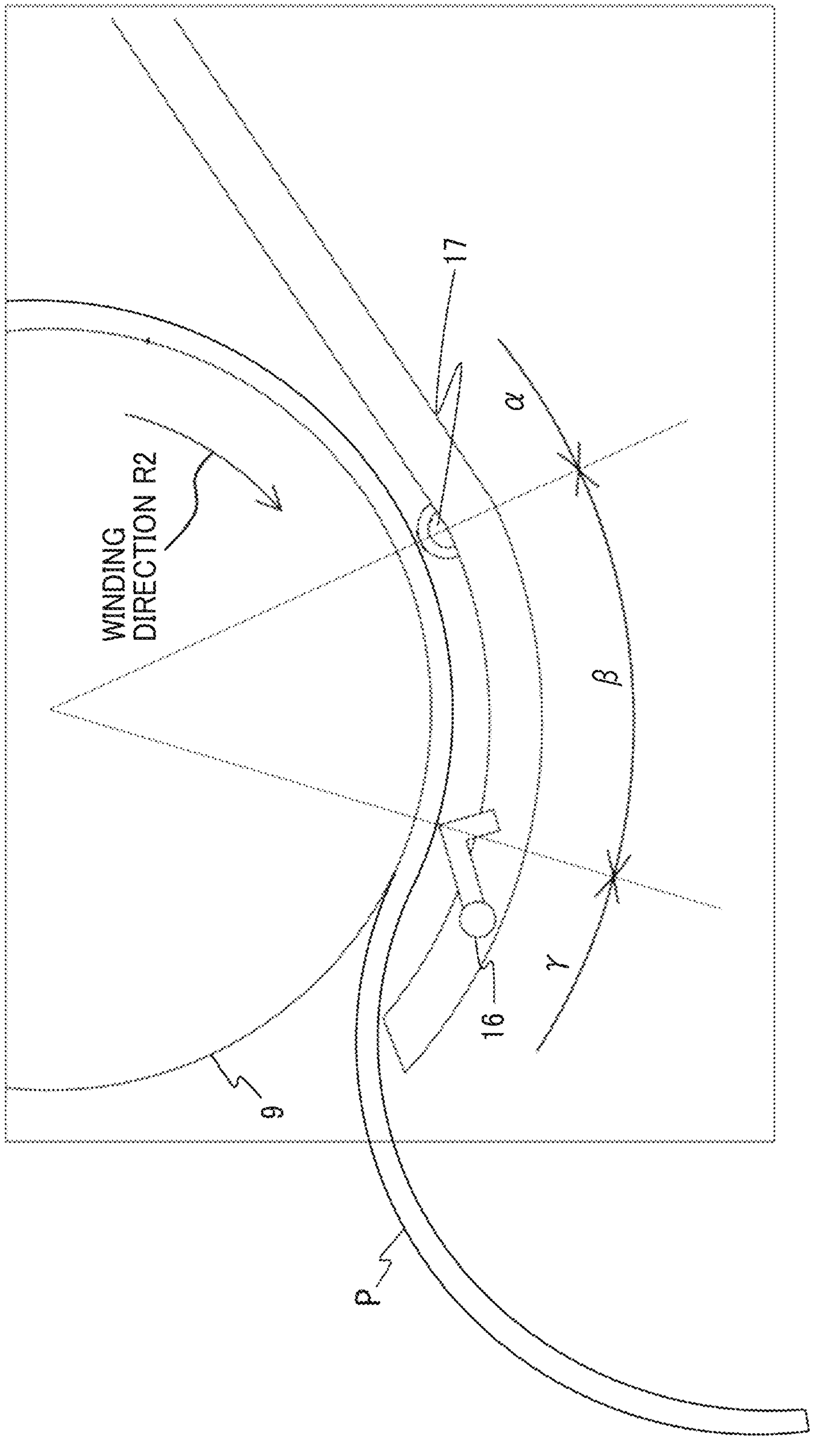
FIG. 8 is a diagram illustrating an example in which the continuous sheet is reversely set and a front end detection process is started.

FIG. 8 illustrates an example of a state where the roll 9 is rotated in the winding direction R2 in the reversely set state. When the reversely set roll 9 is rotated in the winding direction R2, unlike in the case where the roll 9 is set in the proper direction, it is not possible to detect that the front end of the sheet has passed through the front end detection sensor 16 by the method of detecting the first signal change rate K1 such as the rate of the changes in the detection signal illustrated in FIGS. 7A and 7B and then detecting the second signal change rate K2. As a result, the backward rotation (rotation in the winding direction R2) of the roll 9 continues without stopping.

When the rotation of the roll 9 in the winding direction R2 continues even after the front end of the sheet passes through the front end detection sensor 16, the front end of the continuous sheet P protrudes to the outside of the guide arm 13 as illustrated in FIG. 8. As a result, the continuous sheet P may be folded or damaged and become forced to be discarded, which results in a waste of the continuous sheet P. In order to avoid such a waste, it is necessary to detect a reversely set state at the same time of detection of the front end of the sheet.

Figure 9:
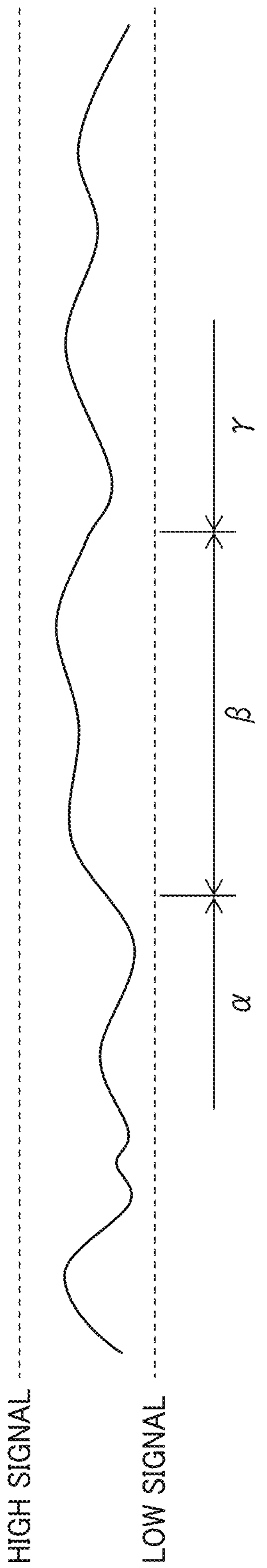
FIG. 9 is a diagram illustrating an example of displacement of a detection signal of the front end detection sensor when the continuous sheet is reversely set.

Even if the roll 9 is reversely set, the detection signal from the front end detection sensor 16 changes according to the rotation of the roll 9. FIG. 9 illustrates an example of changes in the detection signal from the front end detection sensor 16 in the case where the rotation of the roll 9 in the winding direction R2 is continued even in the state illustrated in FIG. 8. When the reversely set roll 9 continues to rotate in the winding direction R2, the front end of the sheet does not pass through the rollers 17 or the front end detection sensor 16, so that the first signal change rate K1 is not detected as in the case of proper setting.

Instead, as illustrated in FIG. 9, the detection signal changes in a range corresponding to the width of irregularities on the outer peripheral surface of the continuous sheet P. The range of the changes does not correspond to the first signal change rate K1 or the second signal change rate K2, but corresponds to a change rate that is under the first signal change rate K1 and the second signal change rate K2.

Figure 10:
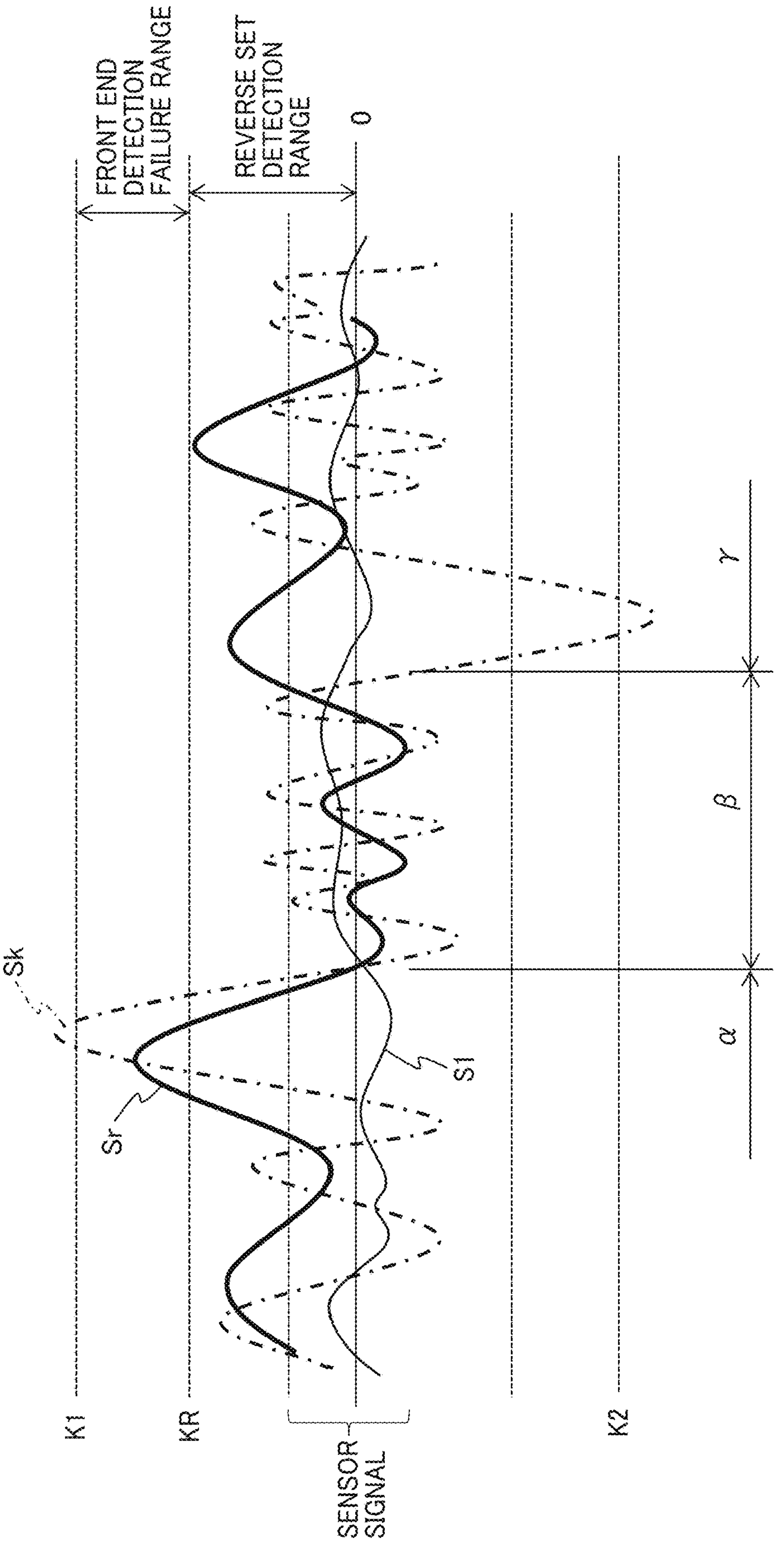
FIG. 10 is a diagram describing a threshold value used to detect reverse setting of the continuous sheet.

Therefore, as illustrated in FIG. 10, a threshold value for detecting an inversely set state (reverse set threshold value KR) is provided between the change rate of the detection signal from the front end detection sensor 16 (first signal change rate K1) and the fluctuation width of the detection signal from the front end detection sensor 16 corresponding to the width of irregularities on the sheet outer peripheral surface illustrated in FIG. 9 in a case where the roll 9 is set in the proper direction and the front end of the sheet set in the proper direction passes through the rollers 17 (the front end of the sheet shifts from the region α to the region β).

For example, when the roll 9 is rotated in the winding direction R2, it is determined that the roll 9 is reversely set if the change rate of the detection signal from the front end detection sensor 16 is not detected at the level corresponding to the first signal change rate K1 or the second signal change rate K2 and does not exceed the reverse set threshold value KR. Providing the reverse set threshold value KR makes it possible to detect the reversely set state by one rotation of the roll 9 in the winding direction R2 without repeating the rotation of the roll 9 in the winding direction R2 for detecting the front end of the sheet.

Figure 11:
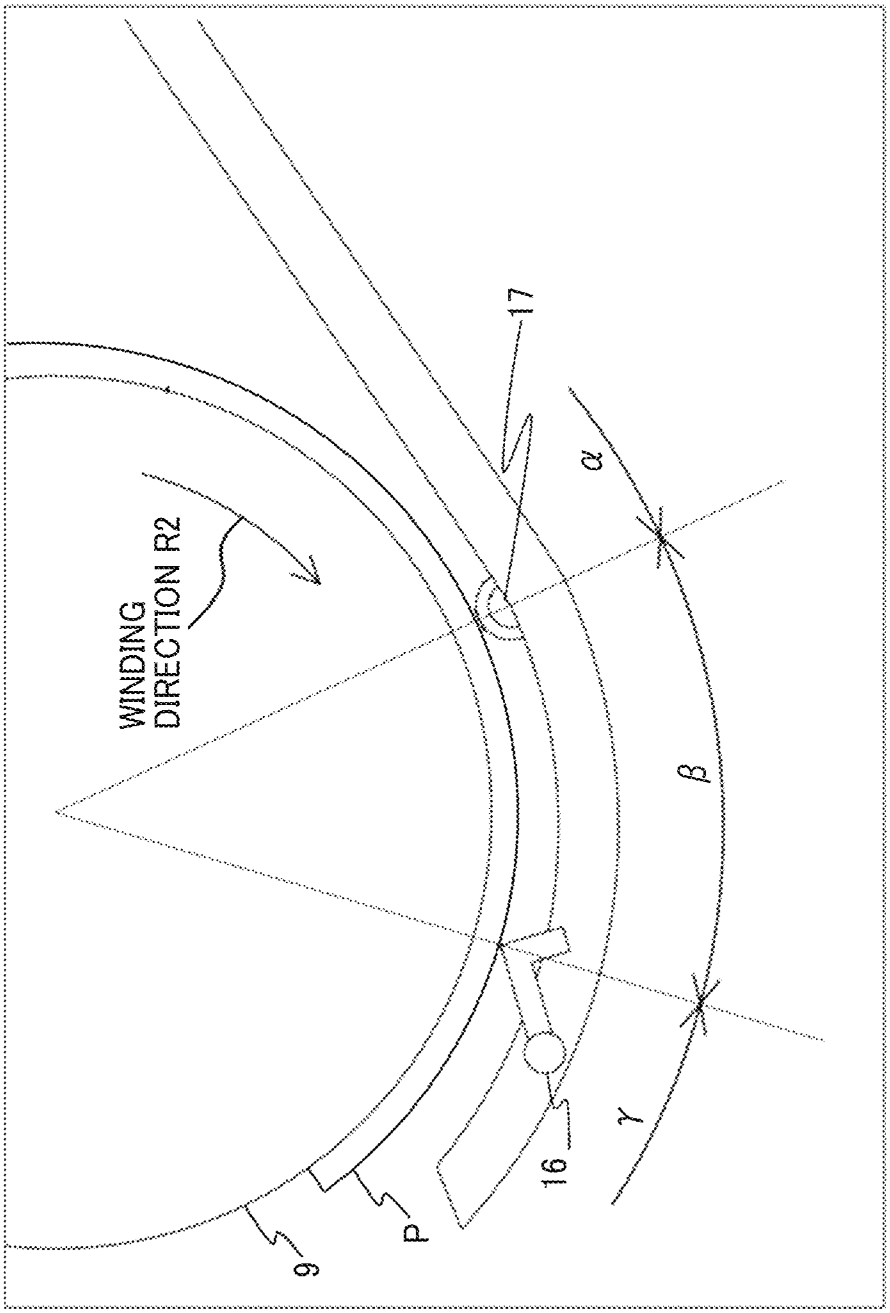
FIG. 11 is a diagram illustrating another example in which the continuous sheet is reversely set and the front end detection process is started.
Figure 12:
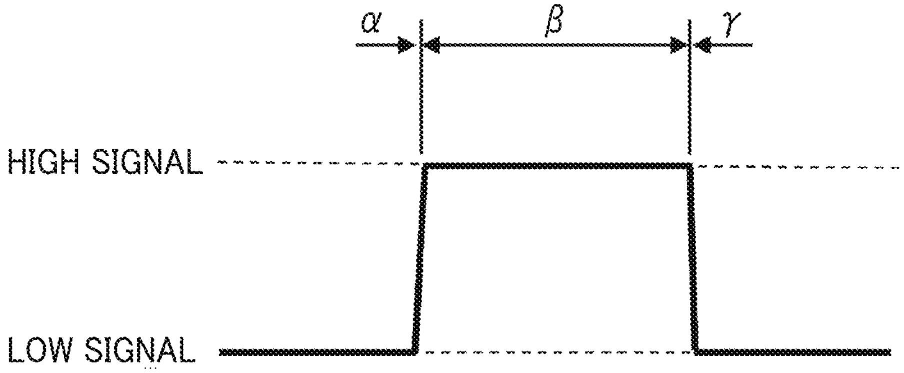
FIG. 12 is a diagram illustrating transition of a level of a detection signal of the front end detection sensor when the continuous sheet is reversely set.

As illustrated in FIG. 11, it is also assumed that if the roll 9 is reversely set, the front end of the continuous sheet P is in close contact with the outer peripheral surface. FIG. 12 illustrates the displacement of the detection signal output by the front end detection sensor 16 with the rotation of the roll 9 in the winding direction R2 in this case.

As illustrated in FIG. 12, the displacement is the reverse of that illustrated in FIG. 7A. In this case, since the front end of the sheet is not detected, the rotation of the roll 9 in the winding direction R2 is continued.

Figure 13A:
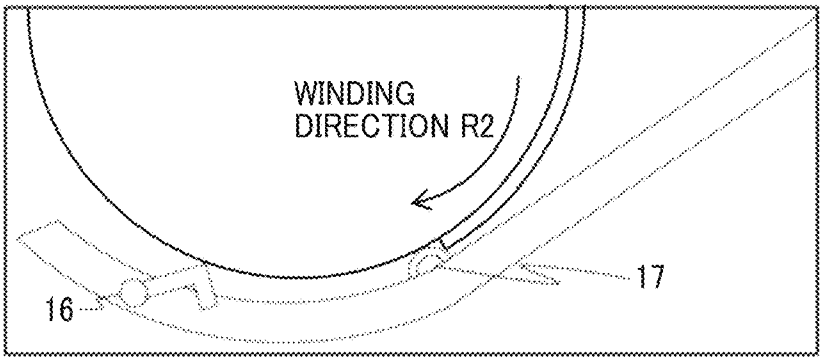
FIGS. 13A to 13C are diagrams illustrating a positional relationship between the front end of the continuous sheet and the front end detection sensor and the roller when the continuous sheet is reversely set.
Figure 13B:
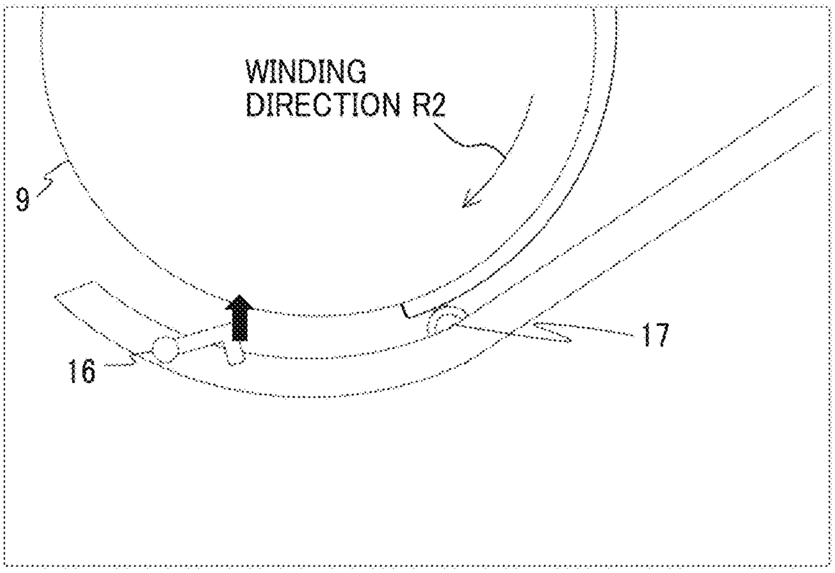
Figure 13C:
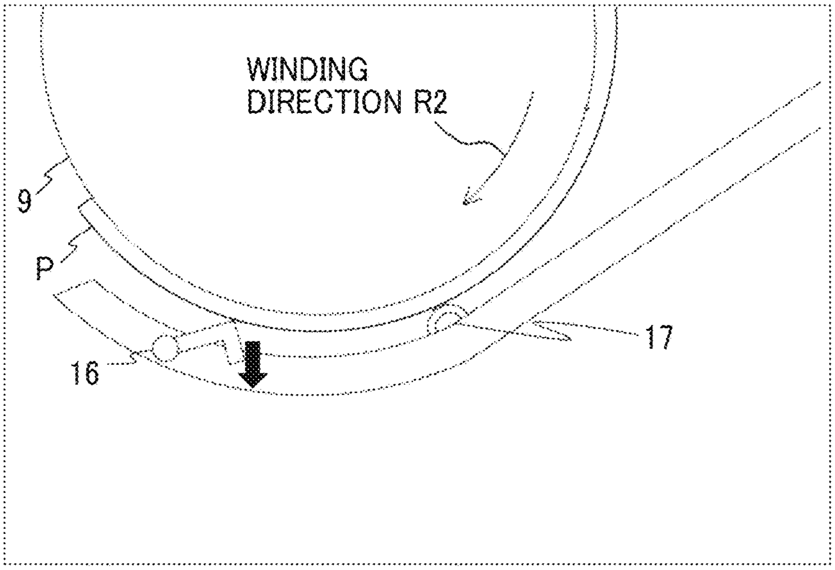

FIGS. 13A to 13C are diagrams illustrating a positional relationship between the front end of the continuous sheet P with the roll 9 reversely set and the front end detection sensor 16 and the roller 17. FIG. 13A illustrates a state in which the front end of the sheet is in the region α. FIG. 13B illustrates a state in which the front end of the sheet is in the region β. First, when the front end of the sheet passes through the rollers 17 (FIG. 13B) from the state before the front end of the sheet passes through the rollers 17 (FIG. 13A), the position of the rollers 17 is displaced with respect to the outer peripheral surface of the roll 9 in a direction away from the outer peripheral surface of the roll 9 by the thickness of the continuous sheet P. As a result, the guide arm 13 rotates by the thickness of the continuous sheet P, and the front end detection sensor 16 protrudes from the facing portion 13*a* by the thickness of the continuous sheet P. That is, when the front end of the sheet passes through the roller 17, the protrusion amount of the front end detection sensor 16 increases.

Until reaching the state of FIG. 13B, the front end detection sensor 16 is in contact with the outer peripheral surface of the roll 9, When the roll 9 rotates in this state, the front end detection sensor 16 outputs a detection signal corresponding to minute displacement of the outer peripheral surface.

Subsequently, FIG. 13C illustrates a state in which the front end of the sheet has reached the region γ. When the roll 9 rotates in the winding direction R2 from the state of FIG. 13B to the state of FIG. 13C, the front end of the sheet passes through the front end detection sensor 16. As a result, the front end detection sensor 16 sinks into the facing portion 13*a* by an amount corresponding to the thickness of the continuous sheet P. That is, when the front end of the sheet passes through the front end detection sensor 16, the protrusion amount of the front end detection sensor 16 decreases.

Therefore, when the roll 9 is rotated in the winding direction R2 in the reversely set state, the detection signal from the front end detection sensor 16 does not change as in the proper set state, but changes in the reverse direction. However, since the first signal change rate K1 and the second signal change rate K2 as the change rates in the reversely set state are treated as absolute values, these absolute values are compared with the reverse set threshold value KR to determine whether the change rate corresponding to the first signal change rate K1 or the second signal change rate K2 exceeds the reverse set threshold value KR. In this manner, it is possible to make a determination on the reversely set state even if the front end of the continuous sheet P is in close contact with the outer peripheral surface.

Hardware Configuration of Printer

Figure 14:
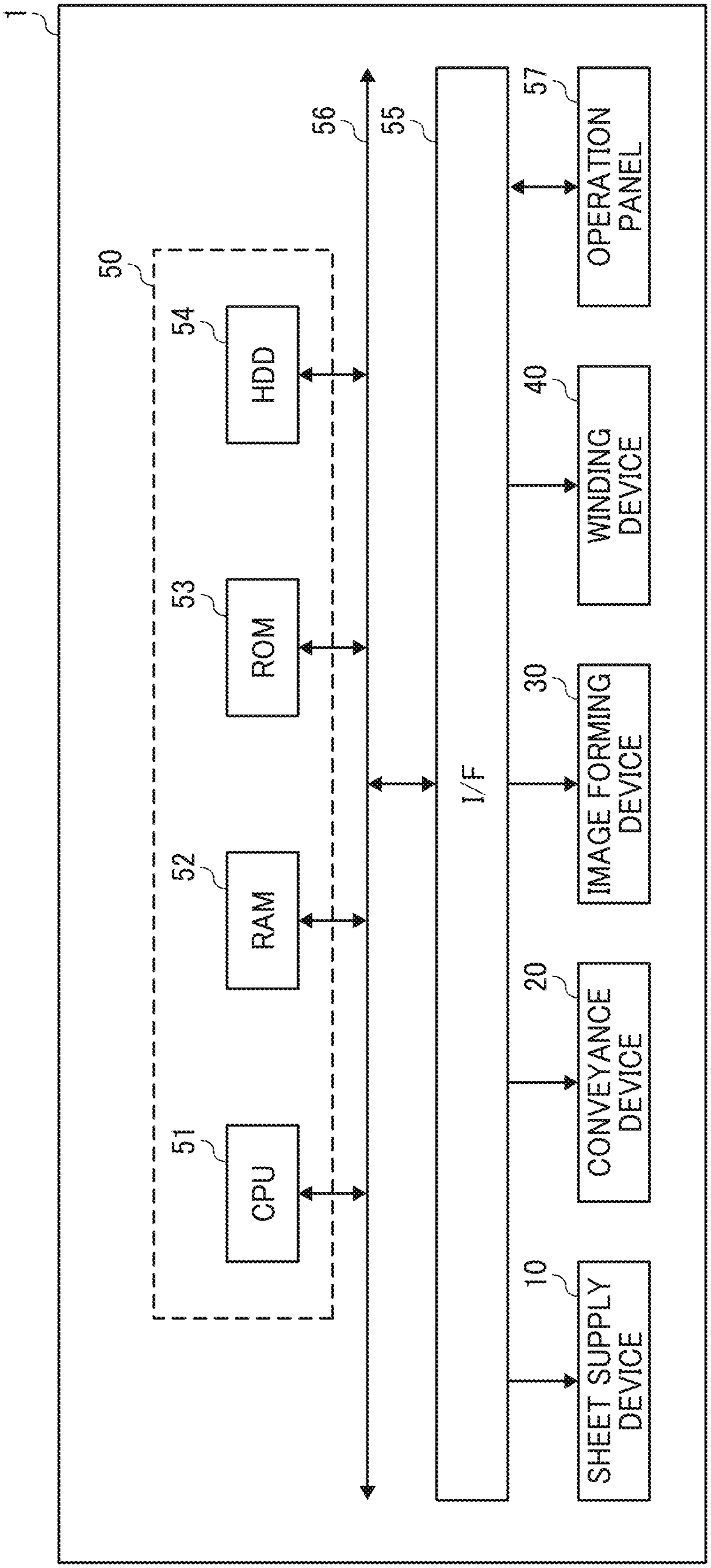
FIG. 14 is a hardware configuration diagram of the image forming apparatus.

Next, a hardware configuration of the printer 1 that executes the processes of enabling the detection of the front end of the sheet and the detection of the reversely set state described above will be described with reference to FIG. 14. As illustrated in FIG. 14, the printer 1 has a configuration in which a central processing unit (CPU) 51 as control circuitry, a random access memory (RAM) 52 as a storage, a read only memory (ROM) 53 as a storage, a hard disk drive (HDD) 54 as a storage, and an I/F 55 as an interface are connected via a common bus 56 as a communication device.

The CPU 51, the RAM 52, the ROM 53, and the HDD 54 are examples of the controller 50.

The CPU 51 is a computing device that controls the operation of the entire printer 1. The RAM 52 is a volatile storage medium from or into which information can be read or written at high speeds, and is used as a work area for the CPU 51 to process information. The ROM 53 is a read-only nonvolatile storage medium, and stores programs such as firmware. The HDD 54 is a nonvolatile storage medium from or into which information can be read or written and which has a large storage capacity, and stores an operating system (OS), various control programs, application programs, and the like.

The printer 1 processes various programs loaded from the ROM 53 or the HDD 54 into the RAM 52 by a computing function of the CPU 51. Through the processing, a software control device including various functional modules of the printer 1 is formed. A combination of the software control device formed as described above and the hardware resources provided in the printer 1 constitutes functional blocks that implement the functions of the printer 1.

The I/F 55 is an interlace that connects the sheet supply device 10, the conveyance device 20, the image forming device 30, the winding device 40, and the operation panel (input device) 57 to the common bus 56. That is, the controller 50 controls the sheet supply device 10, the conveyance device 20, the image forming device 30, the winding device 40, and the operation panel 57 through the I/F 55.

The operation panel 57 is a user interface including a display that displays various types of information to be provided to the operator, and buttons, switches, dials, and the like that receive operations performed by the operator. The operation panel 57 may include a touch panel superimposed on a display. Upon receipt of an operation by an operator, the operation panel 57 outputs an operation signal corresponding to the received operation to the controller 50.

Sheet Setting Process in Printer

Figure 15:
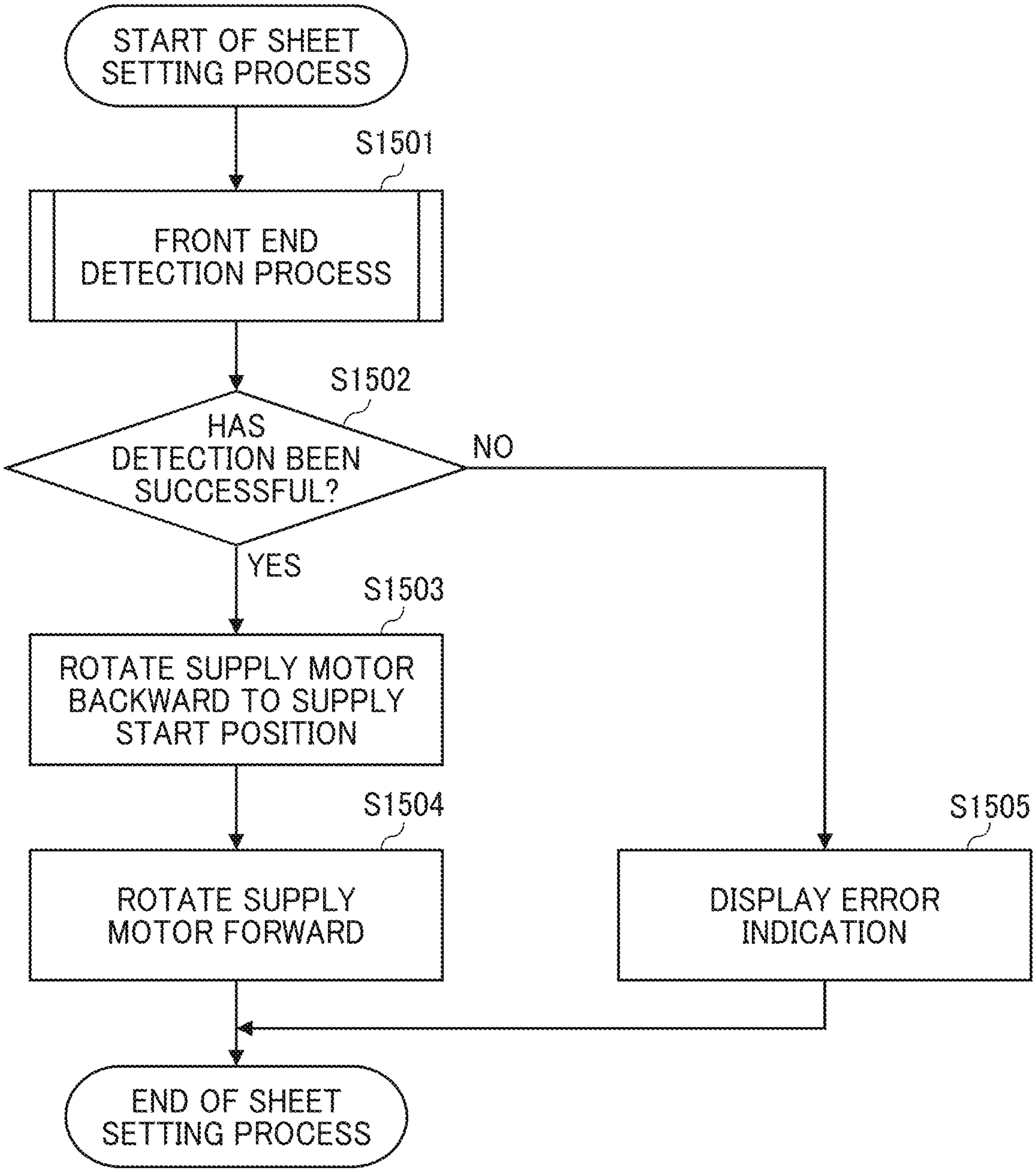
FIG. 15 is a flowchart of a sheet setting process.

Next, a sheet setting process that can be executed in the printer 1 will be described with reference to FIG. 15. FIG. 9 is a flowchart of the sheet setting process. The sheet setting process is a process by which, when a new roll 9 is attached to the supporter 11, the continuous sheet P wound around the roll 9 is brought into a state of being suppliable to the conveyance device 20 through between the guide plates 19.

In the sheet setting process, the roll 9 is rotated in the winding direction R2 (the roll 9 is rotated backward), As described above, the controller 50 controls the rotational operation and rotational direction of the supply motor 12 based on the signal change rate of the front end detection sensor 16 if the roll 9 rotates backward. The sheet setting process is started, for example, at a timing when the attachment of the roll 9 is detected or at a timing when an operation indicating that replacement of the roll 9 is received through the operation panel 57. The attachment timing of the roll 9 is based on a detection signal from a sensor that detects the attachment of the roll 9.

When the sheet setting process is started, a front end detection process is executed (S1501). Details of the front end detection process will be described later. Then, the controller 50 determines whether the front end of the sheet has been successfully detected in the front end detection process (S1502).

If the controller 50 determines that the front end of the sheet has successfully detected (S1502: YES), the controller 50 rotates the supply motor 12 backward to rotate the spool 8 in the winding direction R2 by a predetermined rotation angle (for example, about 355°) from a passage timing determined in the front end detection process (S1503). As a result, the front end of the sheet reaches a supply start position.

The passage timing refers to a timing at which the front end of the sheet passes through the front end detection sensor 16. The supply start position is a position that is located upstream of the front end detection sensor 16 and the rollers 17 in the winding direction and faces the guide portion 13*b*. In other words, the supply start position is a position where the continuous sheet P is supplied in the direction of the guide plate 19 along the guide portion 13*b* by rotating the spool 8 in the feeding direction.

Next, the controller 50 supplies the continuous sheet P along the guide portion 13*b* from the supply start position by rotating the supply motor 12 in the forward direction (S1504). As a result, the continuous sheet P passes between the guide plates 19 and is sandwiched between the conveyance roller 21 and the pressure roller 22.

The printer 1 that has normally completed the sheet setting process can execute an image formation process of forming an image on the continuous sheet P. That is, the controller 50 drives the conveyance motor 23 to convey the continuous sheet P to a position facing the recording heads 31. Next, the controller 50 drives the carriage motor 32 to move the main-scanning carriage 34 in the main-scorning direction, and causes the recording heads 31 to discharge the liquid ink of corresponding colors. By repeating this process, an image is recorded on the continuous sheet P. The controller 50 further drives the winding motor 42 to wind the continuous sheet P on which the image is recorded around the winding roller 41.

On the other hand, when the controller 50 determines that the detection of the front end of the sheet has failed (S1502: NO), the controller 50 stops the supply motor 12 and displays an error on the operation panel 57 as a notification device (S1505). As a result, the operator executes an appropriate operation for example, reattachment of the roll 9, and the like) according to the description of the error displayed on the operation panel 57.

Front End Detection Process in Printer

Figure 16:
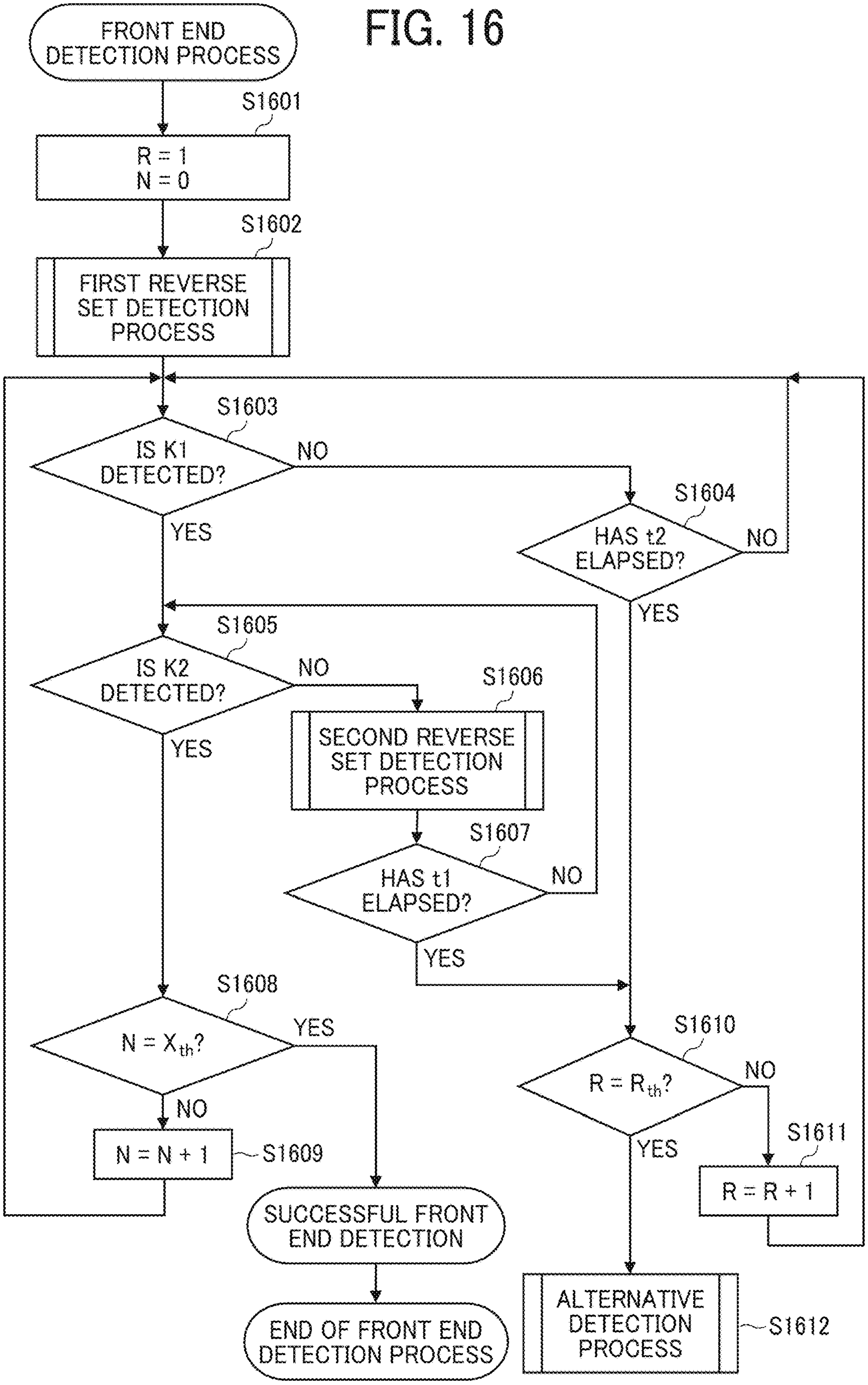
FIG. 16 is a flowchart of a front end detection process.
Figure 17:
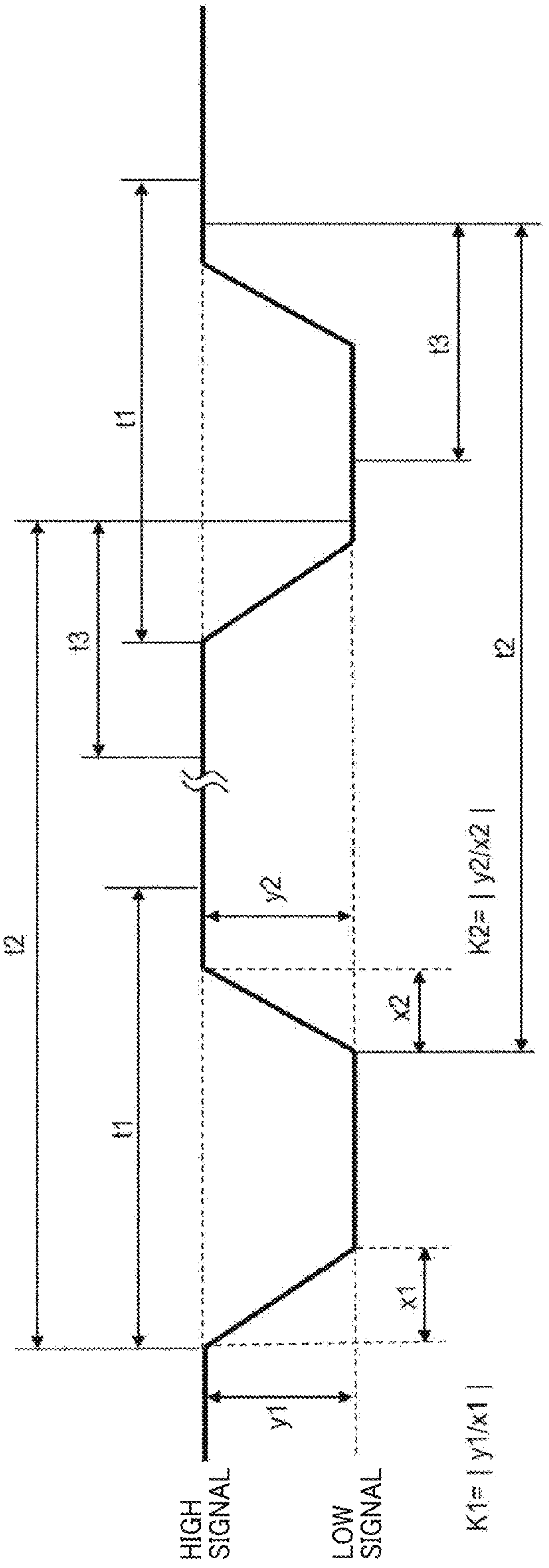
FIG. 17 is a diagram illustrating transition of a level of a detection signal in the front end detection process.
Figure 18:
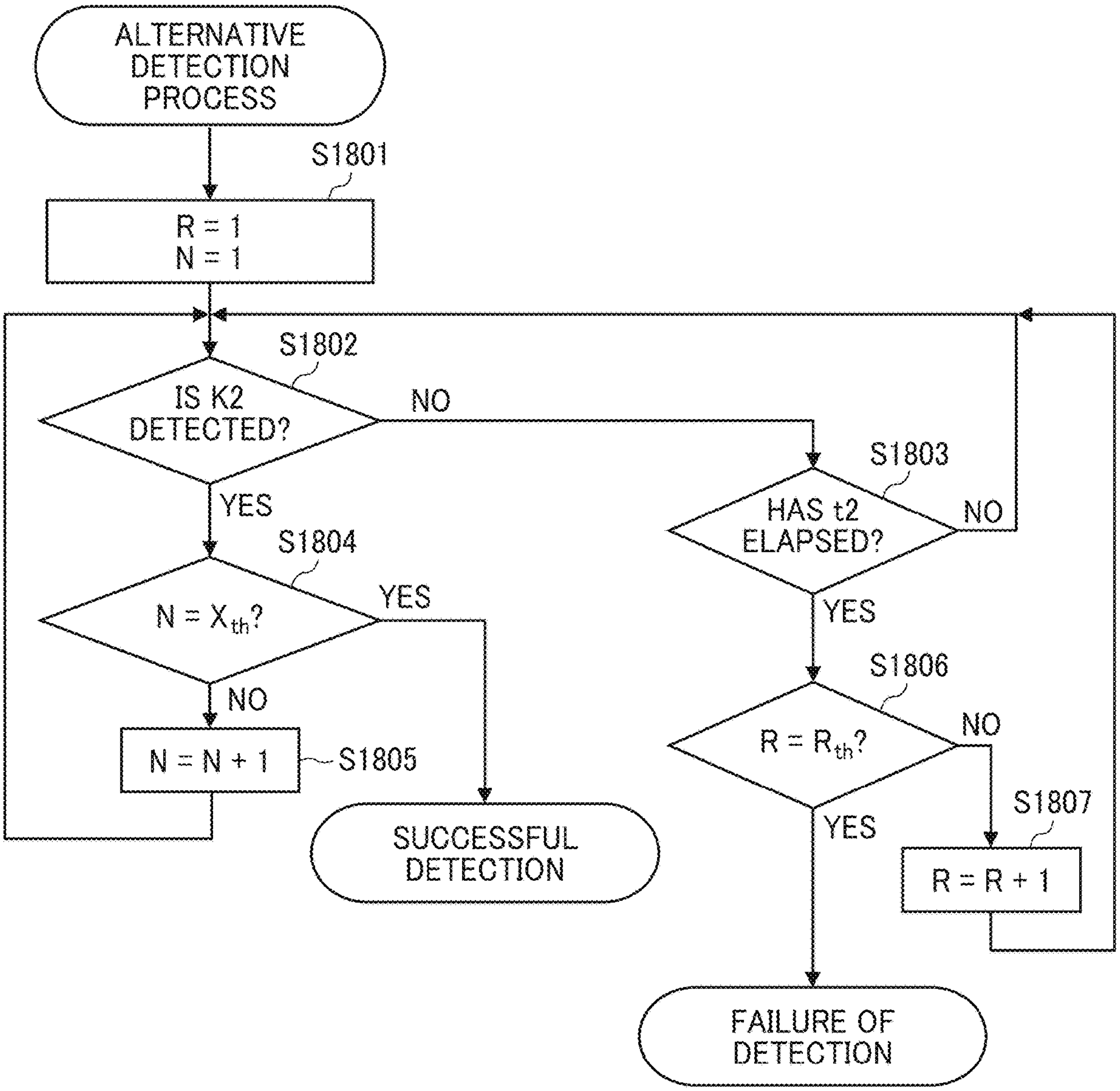
FIG. 18 is a flowchart of an alternative detection process.
Figure 19:
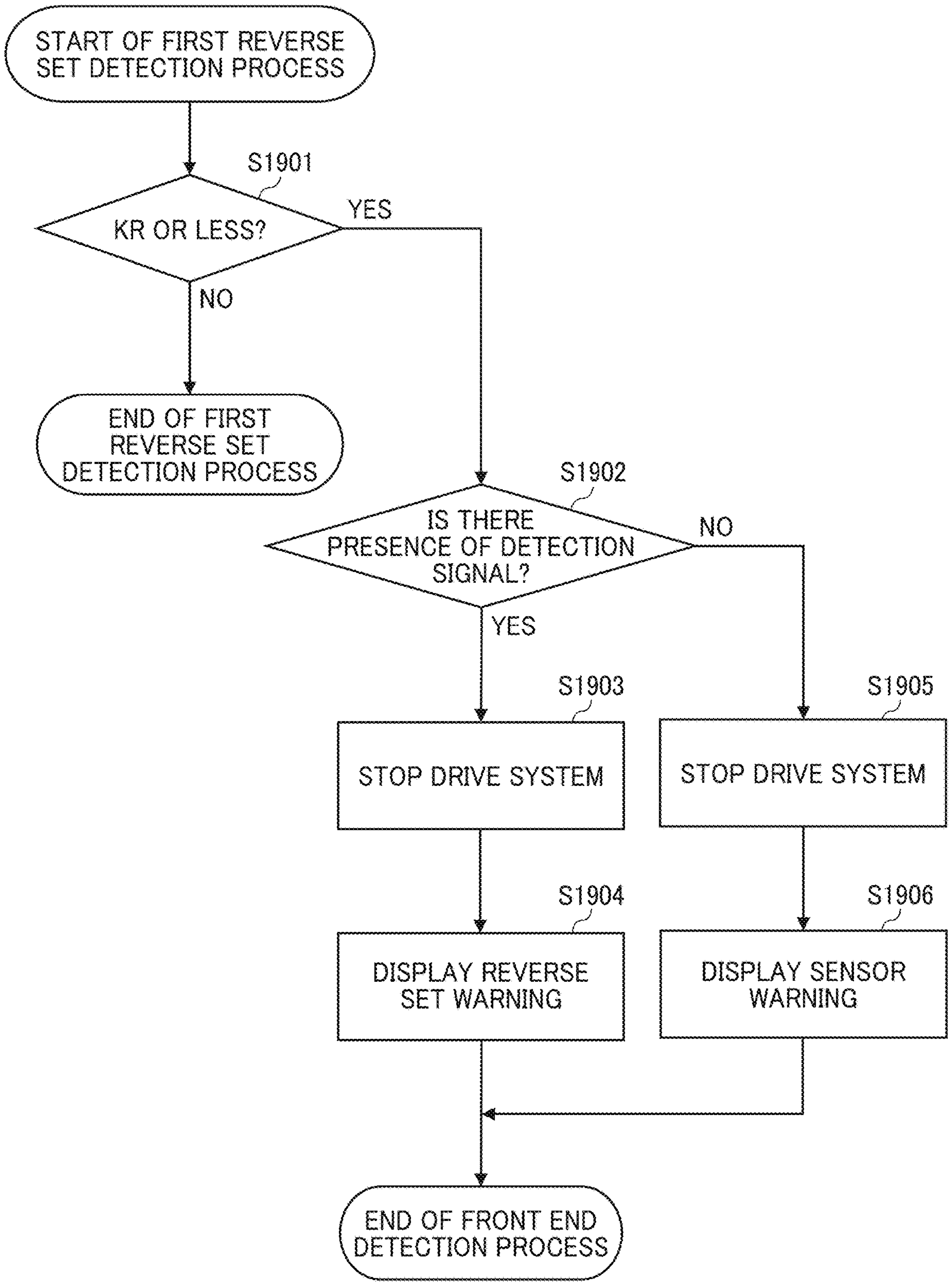
FIG. 19 is a flowchart of a first reverse set detection process.
Figure 20:
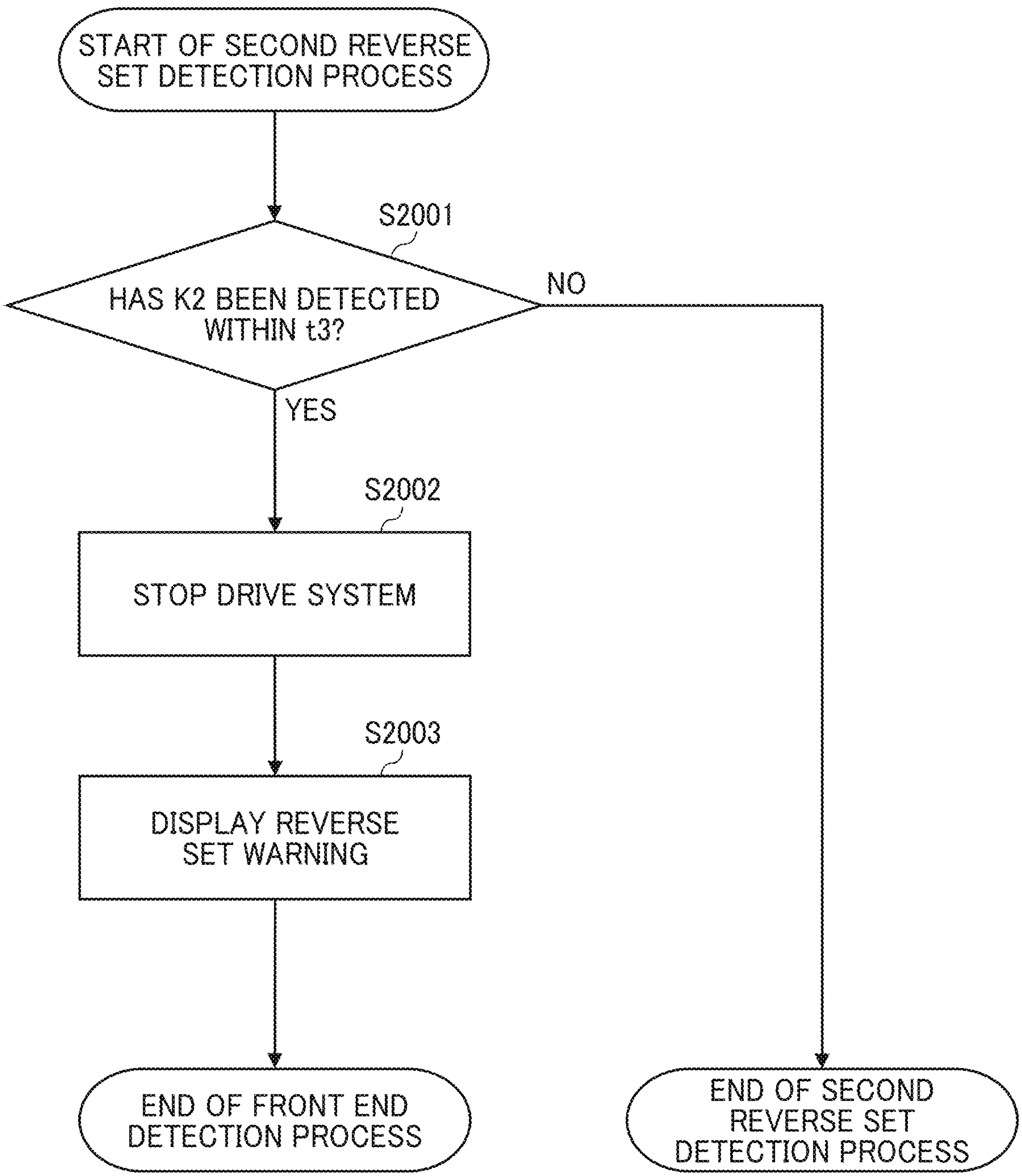
FIG. 20 is a flowchart of a second reverse set detection process.
Figure 21:
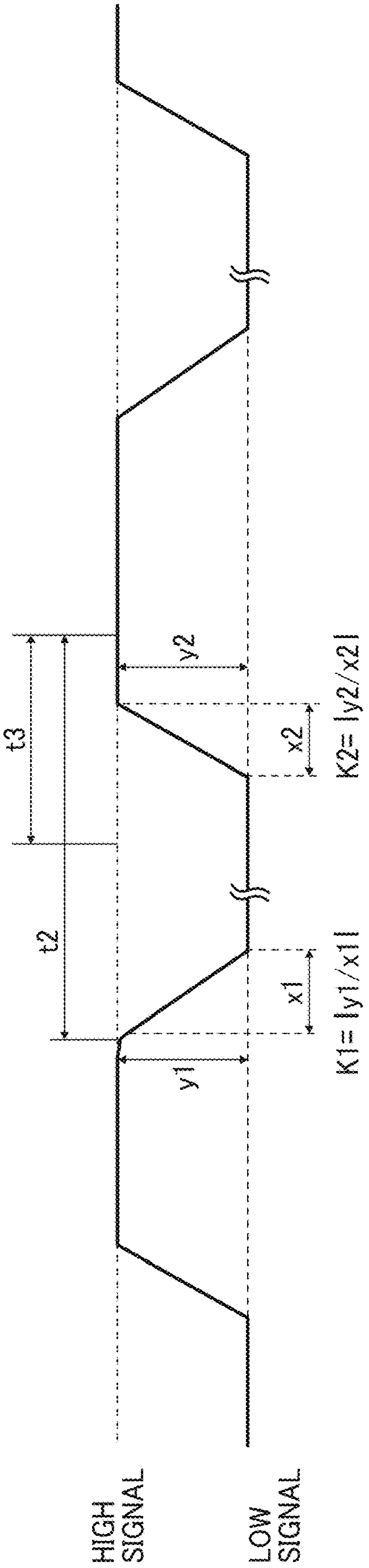
FIG. 21 is a diagram illustrating another example of transition of a detection signal level in the second reverse set detection process.

Next, details of the front end detection process included in the sheet setting process will be described with reference to FIGS. 16 to 21, The front end detection process of detecting the front end of the sheet is performed in step S1501 in FIG. 15. FIG. 16 is a flowchart of the front end detection process. FIG. 17 is a diagram illustrating transition of the level of a detection signal with the roll 9 set in the proper direction. FIG. 21 is a diagram illustrating transition of the level of a detection signal with the roll 9 reversely set. FIG. 18 is a flowchart of an alternative detection process. FIG. 19 is a flowchart illustrating an example of the reverse set detection process executed during the front end detection process. FIG. 20 is a flowchart illustrating another example of the reverse set detection process executed during the front end detection process. During the execution of the front end detection process and the alternative detection process, the roll 9 rotates in the winding direction R2.

The front end detection process illustrated in FIG. 16 is a process of determining the passage timing based on both the first signal change rate K1 and the second signal change rate K2. When the roll 9 is reversely set, the process of detecting the front end of the sheet is repeatedly executed, and the stop condition is not satisfied. In the front end detection process according to the present embodiment, first, it is determined whether the roll 9 is reversely set. If the roll 9 is not reversely set, the front end of the sheet is detected, if the roll 9 is reversely set, the rotation of the roll 9 is stopped.

The alternative detection process illustrated in FIG. 18 is a process of determining the passage timing based on the second signal change rate K2 alone. In the present embodiment, first, the passage timing is determined in the front end detection process, if the passage timing cannot be determined in the front end detection process, the alternative detection processing is executed. However, the front end detection processing and the alternative detection processing may be executed independently.

Referring back to FIG. 16. In the front end detection process, first, the controller 50 initializes variables R and N stored in the RAM 52 (=1) (S1601). The variable R indicates the number of times the spool 8 was rotated in the front end detection process. The variable N indicates the number of times the passage timing was determined in the front end detection process.

Next, the controller 50 executes a first reverse set detection process (S1602). If the controller 50 determines in S1602 that the roll 9 is reversely set, the front end detection process is stopped (ended). If the controller 50 determines in the reverse set detection first process (S1602) that the roll 9 is not reversely set, this means that the roll 9 is properly set. Therefore, the process proceeds from S1602 to S1603, Details of S1602 will be described later.

Next, the controller determines whether the change in the detection signal corresponds to the first signal change rate K (S1603). The controller 50 repeats S1603 until the first signal change rate K1 is detected (S1603: NO) and until a second time t2 elapses (S1604: NO).

Subsequently, if the controller 50 detects the first signal change rate K1 (S1603: Yes), the controller 50 executes the process of detecting the second signal change rate K2 (S1605). At this time, it can be seen that the front end of the sheet has passed through the rollers 17 or the front end detection sensor 16 by the detection of the first signal change rate K1. However, there is a possibility that the roll 9 may be reversely set with the front end of the sheet not peeled off from the outer peripheral surface of the roll 9. After K1 is detected, a second reverse set detection process is executed (S1606) until K2 is detected (S1605: NO). In the second reverse set detection process (S1606), if it is not detected that the roll 9 is reversely set, execution of subsequent processes is waited until a first time t1 elapses (S1607: NO). Details of the second reverse set detection processing will be described later.

If the second signal change rate K2 exceeds the second threshold value (S1605: YES) before the first time t1 elapses (S1607: NO), the controller 50 determines that the front end of the sheet has passed through the front end detection sensor 16.

Here, monitoring at the first time t1 and the second time t2 will be described with reference to FIG. 17. As illustrated in FIG. 17, the first time t1 is a predetermined time corresponding to the separation distance between the rollers 17 and the front end detection sensor 16. More particularly, the first time t1 is a time obtained by adding a margin to the time for the roll 9 to rotate by the separation distance. The second time t2 is a time obtained by adding a +margin to the time for the roll 9 to make one rotation. A third time range t3 is a predetermined time range included in the second time t2. More particularly, the third time range t3 is a time range delayed by a predetermined time from the timing at which the second time t2 elapses (the end of the second time t2). More particularly, the third time range t3 is a range of time obtained by adding a ±margin to the timing at which the front end of the sheet is assumed to pass through the front end detection sensor 16 within the second time t2.

Referring back to FIG. 16. If the second signal change rate K2 is detected (S1605: YES), the controller 50 compares the variable N with a determination threshold value Xth (S1608).

Next, if the variable N is less than the determination threshold value Xth (S1608: NO), the controller 50 increments the variable N by 1 (S1609), and executes step S1603 and subsequent steps again. If the variable N has reached the determination threshold value Xth (S1608: YES), the controller 50 determines that the detection of the front end of the sheet has succeeded, and ends the front end detection process.

That is, while the second time t2 elapses Xth times (S1608: No), if the controller 50 determines the passage timing within the third time range t3 included in each of the Xth times of the second time t2 (S1605: Yes), the controller 50 executes step S1603 at the Xth passage timing. The determination threshold value Xth is a value for determining whether the number of times when it was detected that the front end of the sheet exceeded a predetermined number of times. The determination threshold value Xth may be a value fixed in advance or may be set to a value determined by accepting an operation of inputting a value of N through the operation panel 57. The determination threshold value Xth may be one or two or more.

On the other hand, if the second time t2 has elapsed before detection of the first signal change rate K1 (S1603: NO and S1604: YES), or if the first signal change rate K1 is detected outside the third time range t3, the controller 50 compares the variable R with a rotation threshold value Rth (S1610). Similarly, if the first time t1 has elapsed without being stopped by the reverse set state (S1607: YES) before the second signal change rate K2 is detected (S1605: NO), the controller 50 compares the variable R with the rotation threshold value Rth (S1610).

Then, if the variable R is less than the rotation threshold value Rth (S1610: NO), the controller 50 increments the variable R by 1 (S1611) and executes step S1603 and subsequent steps again.

Next, if the variable R has reached the rotation threshold value Rth (S1610: YES), the controller 50 determines that the detection of the front end of the sheet by the front end detection processing has failed, and executes the substitution detection process (S1612).

That is, if the first change rate and the second change rate cannot be detected (S1603: NO and S1605: NO) and the reversely set state is not determined before the roll 9 makes the Rth rotation in the winding direction (S1610: NO), the controller 50 executes the alternative detection process (S1612). The rotation threshold value Rth is a value for determining whether the number of times when the detection of the front end of the sheet has failed exceeds a predetermined number of times from the start of the front end detection process to the alternative detection process (S1612). The rotation threshold value Rth may be a value fixed in advance or may be set to a value determined by accepting an operation of inputting a value of R through the operation panel 57. The rotation threshold value Rth may be one or two or more.

Alternative Detection Process in Printer

Next, details of the alternative detection process (S1611) will be described. As illustrated in FIG. 18, the controller 50 initializes variables R and N stored in the RAM 52 (=1) (S1801). The definitions of the variables R and N, determination threshold value Xth, and rotation threshold value Rth are similar to those in the front end detection process.

Next, the controller 50 waits for execution of subsequent steps until the second signal change rate K2 of the detection signal exceeds the second threshold value (S1802) or the second time t2 elapses (S1803). If the second signal change rate K2 exceeds the second threshold value within the predetermined third time range t3 (S1803: YES) until the second time t2 elapses (S1802: NO), the controller 50 determines that the front end of the sheet has passed through the front end detection sensor 16 (that is, the passage timing).

Next, if the controller 50 determines the passage timing (S1802: YES), the controller 50 compares the variable N with the determination threshold value Xth (S1804). Next, if the variable N is less than the determination threshold value Xth (S1804: NO), the controller 50 increments the variable N by 1 (S1805), and executes step S1802 and subsequent steps again. Then, if the variable N reaches the determination threshold value Xth (S1804: YES), the controller 50 determines that the detection of the front end of the sheet has succeeded, and ends the substitution detection process. That is, while the second time t2 elapses Xth times (S1804: NO), if the second change rate exceeds the second threshold value within the third time range t3 included in each of the Xth times of the second time t2, the controller 50 determines the timing at which the second change rate exceeded the second threshold value for the Xth time as the passage timing.

On the other hand, if the second time t2 has elapsed before the second signal change rate K2 exceeds the second threshold value (S1802: NO and S1803: YES) or if the second signal change rate K2 exceeds the second threshold value outside the third time range t3, the controller 50 compares the variable R with the rotation threshold value Rth (S1806). Next, if the variable R is less than the rotation threshold value Rth (S1806: NO), the controller 50 increments the variable R by 1 (S1807), and executes step S1802 and subsequent steps again. When the variable R reaches the rotation threshold value Rth (S1806: YES), the controller 50 determines that the detection of the front end of the sheet by the alternative detection process has failed, and ends the alternative detection process.

First Reverse Set Detection Process in Printer

Next, the first reverse set detection process (S1602) will be described in detail with reference to FIG. 19. First, the controller 50 determines whether the change rate of the detection signal exceeds a reverse set threshold value KR (see FIG. 10) (S1901). If the change rate of the detection signal exceeds the reverse set threshold value KR (S1901: NO), the roll 9 is properly set. Therefore, the first reverse set detection process is ended to return to the sheet front end detection process.

If the change rate of the detection signal does not exceed the reverse set threshold value KR (S1901: YES), the controller 50 determines the presence or absence of the detection signal from the front end detection sensor 16 (S1902).

If the detection signal is output from the front end detection sensor 16 (S1902: YES), the roll 9 is reversely set. Therefore, the controller 50 stops the operation of the conveyance drive system including the supply motor 12 (S1903), Then, the controller 50 outputs warning information for notifying “roll reverse set” to the operation panel 57 (S1904).

If the detection signal is not output from the front end detection sensor 16 (S1902: NO), there is a possibility that the front end detection sensor 16 has failed. Therefore, the controller 50 stops the operation of the conveyance drive system including the supply motor 12 (S1905). The controller 50 then outputs warning information for notifying “front end detection sensor anomaly” to the operation panel 57 (S1906).

Second Reverse Set Detection Process in Printer

Next, the second reverse set detection process (S1606) will be described in detail with reference to FIG. 20. First, the controller 50 determines whether the second signal change rate K2 has been detected before the third time range t3 elapses after the detection of the first signal change rate K1 (S1603: YES) (S2001).

The third time range t3 in the second reverse set detection process will be described with reference to FIG. 21. As illustrated in FIG. 21, the third time range t3 is a predetermined time range included in the second time t2 that is a time obtained by adding a +margin to the time from when the roll 9 rotates and the first signal change rate K1 is detected to when the second signal change rate K2 is detected. More specifically, the third time range t3 is a time range delayed by a predetermined time from the timing at which the second time t2 elapses (the end of the second time t2). More specifically, the third time range t3 is also a range time with a =margin at the timing when the front end of the sheet is assumed to pass through the front end detection sensor 16 within the second time t2.

Therefore, if the second signal change rate K2 is detected before the third time range 13 elapses after the detection of the first signal change rate K1 that is detected when the front end of the sheet passes through the rollers 17 (S2001: YES), the controller 50 determines that the roll 9 is reversely set. In this case, the controller 50 stops the operation of the conveyance drive system including the supply motor 12 (S2002). The controller 50 then outputs warning information for notifying “roll reverse set” to the operation panel 57 (S2003).

When the second signal change rate K2 is not detected (S2001: NO), the controller 50 determines that the roll 9 is not reversely set state but is properly set. In this case, the second reverse set detection process is ended (S2004), and the process proceeds to S1607.

According to the above-described embodiment, the following operations and advantageous effects can be achieved, for example.

According to the above-described embodiment, in the process of detecting the front end of the continuous sheet P, it is possible to eliminate problems that may occur when the roll 9 is reversely set. More specifically, in the front end of the sheet detection process, regardless of whether the front end of the sheet is peeled off from the outer peripheral surface of the roll 9 or is in close contact with the outer peripheral surface of the roll 9, the process is stopped if the reversely setting state is determined before the roll 9 rotates a plurality of times in the front end of the sheet detection process.

Accordingly, it is possible to prevent the front end of the sheet from coming out in the reverse direction of the feeding direction to make it difficult to use the continuous sheet. It is also possible to prevent the front end of the sheet from being repeatedly rotated and scratched in close contact with the outer peripheral surface of the roll 9.

The printer 1 according to the present embodiment can detect the front end of the sheet in is in close contact with the outer peripheral surface of the roll 9. Therefore, the front end of the sheet can be stably detected regardless of the thickness, stiffness, curling state, and the like of the continuous sheet P. The front end is automatically detected and inserted between the guide plates 19 simply by attaching the roll 9 to the supporter 11. Therefore, the continuous sheet P can be stably inserted between the guide plates 19 as compared with a case where the continuous sheet P is manually inserted by the operator.

According to the above embodiment, the timing at which the second signal change rate K2 exceeds the second threshold value before the first time t1 elapses after the first signal change rate Ill exceeds the first threshold value is determined as the passage timing. This makes it possible to prevent the irregularities on the roll 9 from being erroneously detected as the front end of the sheet.

According to the above embodiment, since the front end of the sheet is repeatedly detected Xth times, the detection accuracy is improved. Allowing the operator to set the determination threshold value Xth makes it possible to increase the determination threshold value Xth if the continuous sheet P is thin, and decrease the determination threshold value Xth if the continuous sheet P is thick, for example. As a result, both the detection accuracy and the throughput can be achieved.

When the front end of the sheet is inclined with respect to the supply direction, the first signal change rate K1 at the time of passage of the front end of the sheet through the roller 17 tends to decrease. Therefore, as in the above-described embodiment, even if the front end of the sheet cannot be appropriately detected in the front end detection process, the front end of the sheet can be appropriately detected regardless of the degree of inclination of the continuous sheet P by executing the alternative detection process.

Further, in the reverse set detection process in the printer 1 according to the present embodiment, the reverse setting of the roll 9 can be automatically detected by providing a threshold value for a sensor output change amount per unit time of a reverse set detection sensor signal for detecting the reverse setting of the continuous sheet P. Then, when the reverse setting is detected, the operation of the printer 1 is stopped and a warning is displayed on the operation panel 57, so that the operator can respond appropriately and the waste of the continuous sheet P can be prevented. In addition, even if the front end of the continuous sheet P is reversely set in close contact with the outer peripheral surface of the roll 9, this reverse setting can be detected. In this case, the work efficiency of the operator can be improved without wastefully continuing the front end detection process.

Note that the present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

The invention claimed is:

1. A sheet supply device, comprising:

a supporter to support a roll that is a long sheet wound around a spool;

a rotation device to rotate the spool supported by the supporter in a feeding direction in which the sheet is fed out from the spool and a winding direction in which the sheet is wound around the spool;

a guide having a facing portion facing an outer peripheral surface of the roll and a guide portion extending from the facing portion in the feeding direction of the sheet;

a support shall supporting the guide such that the guide is rotatable in a direction in which the facing portion approaches or moves away from the outer peripheral surface, with a downstream end of the guide in the feeding direction as a rotation center;

a biasing member to bias the guide such that the guide rotates in a direction in which the facing portion approaches the roll;

a sensor disposed to protrude from the facing portion toward the roll and biased in a direction to contact the outer peripheral surface of the roll, the sensor to output a detection signal at a level corresponding to an amount at which the sensor protrudes from the facing portion;

a roller supported by the facing portion, to contact the outer peripheral surface of the roll at a position different from a position of the sensor in a circumferential direction of the roll; and control circuitry to:

control the rotation device based on a signal change rate that is a change amount of the level of the detection signal per unit time;

cause the rotation device to rotate the spool in the winding direction; and stop an operation of the rotation device when the signal change rate based on a change in relative positions between the outer peripheral surface and the sensor without passage of a leading end of the sheet through the position of the sensor does not exceed a predetermined reverse set threshold value.

2. The sheet supply device according to claim 1, wherein in a case where, when the rotation device rotates the spool in the winding direction, the signal change rate exceeds the reverse set threshold value and a first change rate exceeds a predetermined threshold value, the first change rate being the signal change rate due to sinking that is a displacement of the sensor in a direction away from a rotation axis of the roll, the control circuitry determines a passage timing at which the leading end of the sheet has passed through the position of the sensor based on the first change rate and a second change rate, the second change rate being the signal change rate due to protrusion that is a displacement of the sensor in a direction approaching a rotation axis of the roll, the control circuitry causes the rotation device to rotate the spool in the winding direction by a predetermined rotation angle from the passage timing to position the leading end of the sheet at a supply start position that is upstream from the sensor and the roller in the winding direction and faces the guide portion, and the control circuitry causes the rotation device to rotate the spool in the feeding direction to supply the sheet along the guide portion from the supply start position.

3. The sheet supply device according to claim 2, wherein the control circuitry stops the operation of the rotation device when the signal change rate exceeds the reverse set threshold value and the first change rate does not exceed the predetermined threshold value.

4. The sheet supply device according to claim 1, further comprising an input device to accept an operation of inputting the reverse set threshold value.

5. The sheet supply device according to claim 1, further comprising a notification device to output warning information when the control circuitry stops the operation of the rotation device based on a determination on the signal change rate.

6. An image forming apparatus comprising:

the sheet supply device according to claim 1; and an image forming device to form an image on a sheet supplied by the sheet supply device.

7. A sheet supply device, comprising:

a supporter to support a roll that is a long sheet wound around a spool;

a rotation device to rotate the spool supported by the supporter in a feeding direction in which the sheet is fed out from the spool and a winding direction in which the sheet is wound around the spool;

a sensor disposed to protrude from a facing portion facing an outer peripheral surface of the roll toward the roll and biased in a direction to contact the outer peripheral surface of the roll, the sensor to output a detection signal at a level corresponding to an amount at which the sensor protrudes from the facing portion; and control circuitry to:

control the rotation device based on a signal change rate that is a change amount of the level of the detection signal per unit time;

cause the rotation device to rotate the spool in the winding direction; and stop an operation of the rotation device when the signal change rate based on a change in relative positions between the outer peripheral surface and the sensor without passage of a leading end of the sheet through the position of the sensor does not exceed a predetermined reverse set threshold value.

8. The sheet supply device according to claim 7, further comprising a guide having the facing portion and a guide portion extending from the facing portion in the feeding direction of the sheet.

9. The sheet supply device according to claim 7, further comprising a support shaft supporting a guide having the facing portion such that the guide is rotatable in a direction in which the facing portion approaches or moves away from the outer peripheral surface, with a downstream end of the guide in the feeding direction as a rotation center.

10. The sheet supply device according to claim 7, further comprising a biasing member to bias a guide having the facing portion such that the guide rotates in a direction in which the facing portion approaches the roll.

11. The sheet supply device according to claim 7, further comprising a roller supported by the facing portion, to contact the outer peripheral surface of the roll at a position different from a position of the sensor in a circumferential direction of the roll.

12. An image forming apparatus, comprising:

the sheet supply device according to claim 7; and an image forming device to form an image on a sheet supplied by the sheet supply device.

* * * * *